United States Patent
Arai et al.

(10) Patent No.: US 8,394,491 B2
(45) Date of Patent: *Mar. 12, 2013

(54) PREPREG AND CARBON FIBER REINFORCED COMPOSITE MATERIALS

(75) Inventors: Nobuyuki Arai, Ehime (JP); Norimitsu Natsume, Iyo-gun (JP); Kenichi Yoshioka, Iyo-gun (JP); Junko Kawasaki, Iyo-gun (JP); Hiroshi Takezaki, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,982

(22) Filed: Aug. 2, 2011

(65) Prior Publication Data

US 2011/0291056 A1 Dec. 1, 2011

Related U.S. Application Data

(60) Continuation of application No. 13/038,674, filed on Mar. 2, 2011, now Pat. No. 8,075,988, which is a division of application No. 12/376,763, filed as application No. PCT/JP2007/065390 on Aug. 7, 2007, now Pat. No. 7,931,958.

(30) Foreign Application Priority Data

Aug. 7, 2006 (JP) .................... 2006-214398
Nov. 20, 2006 (JP) .................... 2006-312531
Feb. 20, 2007 (JP) .................... 2007-038974

(51) Int. Cl.
*B32B 27/04* (2006.01)

(52) U.S. Cl. .................... 428/297.4; 428/300.7

(58) Field of Classification Search ............... 428/297.4, 428/300.7
See application file for complete search history.

(56) References Cited

U.S. PATENT DOCUMENTS

| | | |
|---|---|---|
| 4,556,591 A | 12/1985 | Bannink, Jr. |
| 4,581,155 A | 4/1986 | Goto et al. |
| 4,957,801 A | 9/1990 | Maranci et al. |
| 4,973,514 A | 11/1990 | Gamble et al. |
| 5,028,478 A | 7/1991 | Odagiri et al. |
| 5,057,353 A | 10/1991 | Maranci et al. |
| 5,276,106 A | 1/1994 | Portelli et al. |
| 5,413,847 A | 5/1995 | Kishi et al. |
| 5,728,755 A | 3/1998 | Weigel et al. |
| 5,789,073 A | 8/1998 | Odagiri et al. |
| 5,853,882 A | 12/1998 | Cenedella et al. |
| 5,962,348 A | 10/1999 | Bootle et al. |

(Continued)

FOREIGN PATENT DOCUMENTS

| | | |
|---|---|---|
| EP | 0 488 389 A2 | 6/1992 |
| EP | 0 707 032 A1 | 4/1996 |

(Continued)

OTHER PUBLICATIONS

European Patent Office Communication dated Oct. 1, 2012 for European Application No. 07792059.3-2115.

(Continued)

*Primary Examiner* — N. Edwards
(74) *Attorney, Agent, or Firm* — Birch, Stewart, Kolasch & Birch, LLP

(57) ABSTRACT

A prepreg containing a carbon fiber [A] and a thermosetting resin [B], and in addition, satisfying at least one of the following (1) and (2).
(1) a thermoplastic resin particle or fiber [C] and a conductive particle or fiber [D] are contained, and weight ratio expressed by [compounding amount of [C] (parts by weight)]/[compounding amount of [D] (parts by weight)] is 1 to 1000.
(2) a conductive particle or fiber of which thermoplastic resin nucleus or core is coated with a conductive substance [E] is contained.

20 Claims, 1 Drawing Sheet

U.S. PATENT DOCUMENTS

| | | |
|---|---|---|
| 6,007,917 A | 12/1999 | Weigel et al. |
| 6,592,986 B1 * | 7/2003 | Hakotani et al. ............. 428/332 |
| 6,596,373 B1 | 7/2003 | Kishi et al. |
| 6,989,197 B2 | 1/2006 | Schneider |
| 7,431,981 B2 * | 10/2008 | Schneider ................. 428/298.1 |
| 7,754,322 B2 | 7/2010 | Tilbrook et al. |
| 7,811,666 B2 | 10/2010 | Dry |
| 7,931,958 B2 * | 4/2011 | Arai et al. ................. 428/297.4 |
| 8,075,988 B2 * | 12/2011 | Arai et al. ................. 428/297.4 |
| 2005/0019574 A1 | 1/2005 | McCrary |
| 2005/0070185 A1 | 3/2005 | Schneider |
| 2007/0087198 A1 | 4/2007 | Dry |
| 2008/0295955 A1 | 12/2008 | Cawse et al. |

FOREIGN PATENT DOCUMENTS

| | | |
|---|---|---|
| EP | 0 885 704 A1 | 12/1998 |
| EP | 1 099 541 A1 | 5/2001 |
| JP | 58-166050 A | 10/1983 |
| JP | 63-166534 A | 7/1988 |
| JP | 63-294610 | 12/1988 |
| JP | 3-26728 A | 2/1991 |
| JP | 3-26750 A | 2/1991 |
| JP | 4-73113 A | 3/1992 |
| JP | 5-3828 B2 | 1/1993 |
| JP | 5-61342 U | 8/1993 |
| JP | 06-207033 | 7/1994 |
| JP | 6-344519 A | 12/1994 |
| JP | 7-192733 A | 7/1995 |
| JP | 8-31231 A | 2/1996 |
| JP | 8-34864 A | 2/1996 |
| JP | 08-259713 | 10/1996 |
| JP | 10-8005 A | 1/1998 |
| JP | 10-231372 A | 9/1998 |
| JP | 11-35699 A | 2/1999 |
| JP | 11-267648 A | 10/1999 |
| JP | 11-329078 A | 11/1999 |
| JP | 2001-67933 A | 3/2001 |
| JP | 2001-358176 A | 12/2001 |
| JP | 2002-231051 A | 8/2002 |
| JP | 2002-338794 A | 11/2002 |
| JP | 2002-338802 A | 11/2002 |
| JP | 2005-105152 | 4/2005 |
| JP | 2006-89734 A | 4/2006 |
| WO | WO 2008/056123 A1 | 5/2008 |

OTHER PUBLICATIONS

Nagata et al., Effect of Particle Size of Graphites on Electrical Conductivity of Graphite/Polymer Composite, Composite Interfaces, vol. 6, No. 5, pp. 483-495, 1999.

* cited by examiner

[Fig. 1]
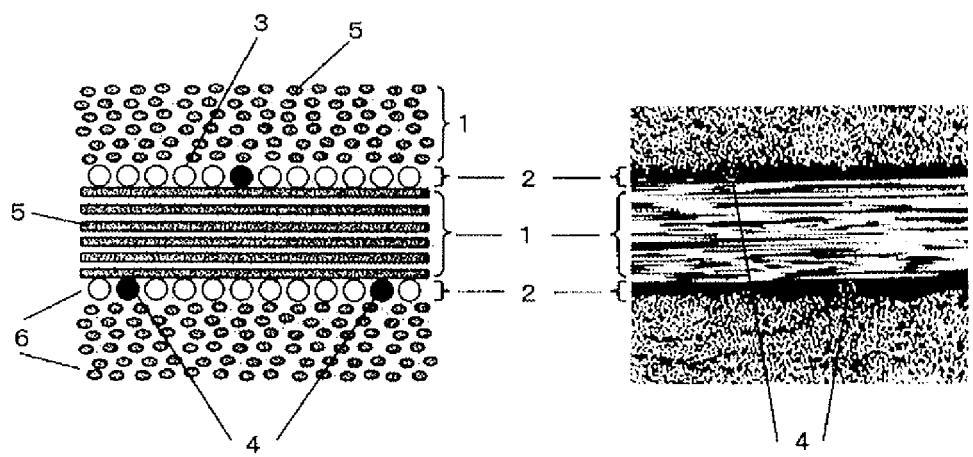
[Fig. 2]
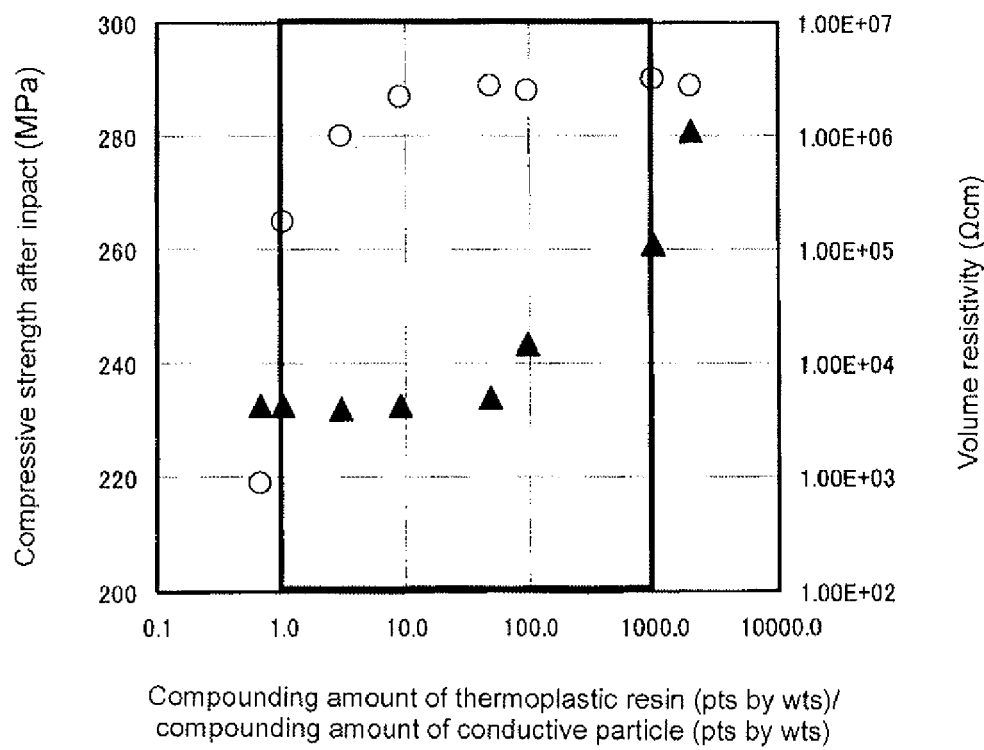
Compounding amount of thermoplastic resin (pts by wts)/
compounding amount of conductive particle (pts by wts)

PREPREG AND CARBON FIBER REINFORCED COMPOSITE MATERIALS

CROSS REFERENCE TO RELATED APPLICATIONS

The present application is a 37 C.F.R. §1.53(b) divisional of, and claims priority to, U.S. application Ser. No. 13/038,674, filed on Mar. 2, 2011. Application Ser. No. 13/038,674 claims benefit under 35 USC §120 to U.S. application Ser. No. 12/376,763 filed on Feb. 6, 2009, which is the national phase under 35 U.S.C. §371 of International Application No. PCT/JP2007/065390, filed on Aug. 7, 2007, now granted as U.S. Pat. No. 7,931,958 B2, issued Apr. 26, 2011. Priority is also claimed to Japanese Application No. 2006-214398 filed on Aug. 7, 2006; Japanese Application No. 2006-312531 filed on Nov. 20, 2006; and Japanese Application No. 2007-038974 filed on Feb. 20, 2007. The entire contents of each of these applications is hereby incorporated by reference.

TECHNICAL FIELD

The present invention relates to a prepreg and carbon fiber reinforced composite material having an excellent impact resistance and conductivity together.

BACKGROUND ART

Carbon fiber reinforced composite materials are useful since they are excellent in strength, stiffness, conductivity, etc., and widely used for an aircraft structural member, a windmill wing, an automotive outer panel and computer uses such as an IC tray or a housing of notebook computer and their needs are increasing year by year.

The carbon fiber reinforced composite material is generally an inhomogeneous material obtained by molding a prepreg of which essential constituting elements are a carbon fiber which is a reinforcing fiber and a matrix resin, and accordingly, there is a big difference between physical properties of arranging direction of the reinforcing fiber and physical properties of other direction. For example, it is known that an impact resistance expressed by a resistance to drop impact is, since it is determined by delamination strength which is quantitatively measured as interlayer edge peel strength, not resulted in a drastic improvement only by increasing strength of the reinforcing fiber. In particular, carbon fiber reinforced composite materials of which matrix resin is a thermosetting resin has, in reflection of a low toughness of the matrix resin, a property to be broken easily by a stress from other than the arranging direction of the reinforcing fiber. Accordingly, various means are proposed for the purpose of improving physical properties of composite material capable of resisting to the stress from other than the arranging direction of the reinforcing fiber.

As one of them, a prepreg provided with a resin layer, in which resin particles are dispersed, on surface region of the prepreg is proposed. For example, a method for providing a high toughness composite material excellent in heat resistance, by using a prepreg provided with a resin layer in which particles consisting of a thermoplastic resin such as nylon are dispersed in surface region of the prepreg, is proposed (refer to Patent reference 1). And, other than that, a method for developing a high toughness of composite material by a combination of a matrix resin of which toughness is improved by adding a polysulfone oligomer and a particle consisting of a thermosetting resin is proposed (refer to Patent reference 2). However, these methods give a high impact resistance to carbon fiber reinforced composite material on one hand, but on the other hand, result in producing a resin layer to become an insulating layer in the interlayer. Accordingly, there is a defect that the conductivity in thickness direction, among conductivities which are one of characteristics of the carbon fiber reinforced composite material, significantly decreases, and it was difficult to make an excellent impact resistance and conductivity compatible in the carbon fiber reinforced composite material.

Furthermore, as methods for improving conductivity of the interlayer, a method of compounding a metal particle to a matrix resin of carbon fiber reinforced composite material (refer to Patent reference 3), or a method of compounding a carbon particle (refer to Patent reference 4) can be considered, but in these references, no reference is made to a compatibility of an excellent impact resistance and conductivity.

[Patent reference 1] specification of U.S. Pat. No. 5,028,478
[Patent reference 2] JP-H3-26750A
[Patent reference 3] JP-H6-344519A
[Patent reference 4] JP-H8-34864A

DISCLOSURE OF THE INVENTION

Problems to be Solved by the Invention

In such a circumstance, the purpose of the present invention is to provide a prepreg and carbon fiber reinforced composite material having an excellent impact resistance and conductivity in thickness direction together.

Means for Solving the Problems

The prepreg of the present invention has the following constitution to achieve the above-mentioned purpose. That is, a prepreg containing a carbon fiber [A] and a thermosetting resin [B] and in addition, satisfying at least any one of the following (1) and (2).

(1) A thermoplastic resin particle or fiber [C] and a conductive particle or fiber [D] are contained, and a weight ratio expressed by [compounding amount of [C] (parts by weight)]/[compounding amount of [D] (parts by weight)] is 1 to 1000.

(2) A conductive particle or fiber of which thermoplastic resin nucleus or core is coated with a conductive substance [E] is contained.

Furthermore, the carbon fiber reinforced composite material of the present invention has the following constitution to achieve the above-mentioned purpose. That is, a carbon fiber reinforced composite material containing a carbon fiber [A] and a thermosetting resin [B] and in addition, satisfying at least any one of the following (1) and (2).

(1) A thermoplastic resin particle or fiber [C] and conductive particle or fiber [D] are contained, and a weight ratio expressed by [compounding amount of [C] (parts by weight)]/[compounding amount of [D] (parts by weight)] is 1 to 1000.

(2) A conductive particle or fiber of which thermoplastic resin nucleus or core is coated with a conductive substance [E] is contained.

Effect of the Invention

By the present invention, it is possible to obtain a carbon fiber reinforced composite material having an excellent impact resistance and conductivity together. By conventional arts, only a carbon fiber reinforced composite material which is low in conductivity when its impact resistance is high or which is low in impact resistance when its conductivity is high, but by the present invention, it became possible to provide a carbon fiber reinforced composite material simultaneously satisfying the impact resistance and the conductivity.

BRIEF EXPLANATION OF THE DRAWINGS

FIG. 1 An example of cross-sectional view of a representative prepreg.

FIG. 2 A graph which shows compressive strength after impact and volume resistivity in relation to the weight ratio expressed by [compounding amount of [C] (parts by weight)]/[compounding amount of [D] (parts by weight)].

| [Explanation of references] | |
|---|---|
| 1: | carbon fiber layer (intralayer) |
| 2: | inter-formative layer (interlayer) |
| 3: | thermoplastic resin particle |
| 4: | conductive particle |
| 5: | carbon fiber |
| 6: | thermosetting resin |

BEST MODE FOR CARRYING OUT THE INVENTION

The inventors surprisingly found that, as a result of investigating hard on conductivity mechanism in thickness direction of a carbon fiber reinforced composite material consisting of a carbon fiber and a thermosetting resin, a carbon fiber reinforced composite material having in a high level an excellent impact resistance and conductivity together can be obtained without decreasing carbon fiber content by, in addition to the thermoplastic resin particle or fiber which imparts a high impact resistance to the interlayer part on one hand but results in producing a resin layer to become an insulating layer in the interlayer, further compounding a conductive particle or fiber in a specified weight ratio, or compounding a conductive particle or fiber of which thermoplastic resin nucleus or core is coated with a conductive substance in the interlayer part, and conceived a prepreg capable of obtaining such a carbon fiber reinforced composite material.

Prepreg is an intermediate base material for molding made by impregnating with a matrix resin to a reinforcing fiber, and in the present invention, carbon fiber is used as the reinforcing fiber and a thermosetting resin is used as the matrix resin. In such a prepreg, the thermosetting resin is in an uncured state, and by laying-up the prepreg and by curing, a carbon fiber reinforced composite material is obtained. As a matter of course, even by curing a single layer prepreg, a carbon fiber reinforced composite material can be obtained. In a carbon fiber reinforced composite material obtained by laying-up a plural of prepregs and by curing, a surface portion of the prepreg becomes to an interlayer part of the carbon fiber reinforced composite material and an inner part of the prepregs become to an intralayer part of the carbon fiber reinforced composite material.

The prepreg of the present invention is a prepreg containing the carbon fiber [A] and the thermosetting resin [B] and in addition, satisfying at least any one of the following (1) and (2).

(1) A thermoplastic resin particle or fiber [C] and a conductive particle or fiber [D] are contained, and a weight ratio expressed by [compounding amount of [C] (parts by weight)]/[compounding amount of [D] (parts by weight)] is 1 to 1000.

(2) A conductive particle or fiber of which thermoplastic resin nucleus or core is coated with a conductive substance [E] is contained.

In an embodiment satisfying the item (1), the prepreg or the carbon fiber reinforced composite material obtainable from the prepreg contains the carbon fiber [A], the thermosetting resin [B], the thermoplastic resin particle or fiber [C] and the conductive particle or fiber [D]. In this embodiment, it is preferable to use a thermoplastic resin particle as the [C] and a conductive particle as the [D]. It is because a case where both of the [C] and the [D] are made into particle configuration is, compared to a case where one of them is in fiber configuration or both of them are in fiber configuration, better in flow characteristics of the thermosetting resin and excellent in impregnating property to the carbon fiber. And, by using the thermoplastic resin particle and the conductive particle in combination, when a drop impact (or a localized impact) is added to the carbon fiber reinforced composite material, since an interlayer delamination caused by the localized impact is reduced, in case where a stress is loaded to the carbon fiber reinforced composite material after such an impact, delamination parts generated by the above-mentioned localized impact which would be starting points of breakage by stress concentration are not many, and since a probability of contact of the conductive particle with the carbon fiber in the laminate layer is high to make it easy to form a conductive path, a carbon fiber reinforced composite material which exhibits a high impact resistance and conductivity can be obtained.

On the other hand, in an embodiment satisfying the item (2), the prepreg or the carbon fiber reinforced composite material obtainable from the prepreg contains the carbon fiber [A], the thermosetting resin [B] and the conductive particle of which thermoplastic resin nucleus is coated with a conductive substance or the conductive fiber of which core of thermoplastic resin is coated with a conductive substance [E]. Here, the [E] is, among the above-mentioned [D], that having a specific embodiment where a conductive particle of which thermoplastic resin nucleus is coated with a conductive substance or where a conductive fiber of which core of thermoplastic resin is coated with a conductive substance. By using the [E] having such a specific embodiment, the effect obtained by using the above-mentioned [C] and the [D] in combination, can be obtained only by the [E].

The embodiment satisfying the item (1) is, compared to the embodiment satisfying the item (2), due to an effect of excellent toughness by the thermoplastic resin particle or fiber [D] in the interlayer part, it is excellent in viewpoint that a delamination strength is high and an impact resistance is still high when a drop impact is added to the carbon fiber reinforced composite material. On the other hand, the embodiment satisfying the item (2) is, compared to the embodiment satisfying the item (1), since components to be used are not many, excellent in viewpoint of expectation of cost reduction and productivity improvement.

It is preferable that the carbon fiber [A] used in the present invention is, in view of exhibiting a higher conductivity, a carbon fiber having a tensile modulus of at least 260 GPa, but in view of compatibility with the impact resistance, it is preferable to be a carbon fiber having a tensile modulus of at most 440 GPa. In view of such a point, it is especially preferable that the tensile modulus is in the range of 280 to 400 GPa, since conductivity and impact resistance can be compatible at a high level.

In addition, in view of impact resistance, since it is possible to obtain a composite material excellent in impact resistance and having a high stiffness and mechanical strength, it is preferable to be a high-strength high-elongation carbon fiber of which tensile strength is 4.4 to 6.5 GPa and tensile strain is 1.7 to 2.3%. Accordingly, in view of compatibility of conductivity and impact resistance, a carbon fiber having all characteristics of a tensile modulus of at least 280 GPa, a tensile strength of at least 4.4 GPa and a tensile strain of at least 1.7% is most appropriate. The tensile modulus, the tensile strength and the tensile strain can be determined by the strand tensile test described in JIS R7601-1986.

The thermosetting resin [B] used in the present invention is not especially limited, as far as it is a resin capable of forming a three-dimensional cross-linked structure at least partially by progressing a cross-linking reaction by heat. As such a thermosetting resin, for example, an unsaturated polyester resin, a vinyl ester resin, an epoxy resin, a benzoxazine resin, a phenol resin, an urea-formaldehyde resin, a melamine formaldehyde resin and a polyimide resin, etc., are mentioned, and denaturations thereof and resins in which 2 kinds or more of them are blended can also be used. And, these thermosetting resins may be self-curable by heat or a hardener or a curing accelerator or the like may be compounded therein.

Among these thermosetting resins, epoxy resin excellent in a balance of heat resistance, mechanical characteristics and adhesion with carbon fiber is preferably used. In particular, amines, phenols or an epoxy resin of which precursor is a compound having a carbon-carbon double bond are preferably used. Concretely, as glycidyl amine type epoxy resins of which precursor is an amine, tetraglycidyldiaminodiphenylmethane, triglycidyl-p-aminophenol and various isomers of triglycidylaminocresol are mentioned. Tetraglycidyldiaminodiphenyl methane is preferable as a resin for composite material of aircraft structural material since it is excellent in heat resistance.

Furthermore, as a thermosetting resin, a glycidyl ether type epoxy resin of which precursor is phenol is also preferably used. As such epoxy resins, bisphenol A type epoxy resin, bisphenol F type epoxy resin, bisphenol S type epoxy resin, phenol novolac type epoxy resin, cresol novolac type epoxy resin and resorcinol type epoxy resin are mentioned.

Since a bisphenol A type epoxy resin, bisphenol F type epoxy resin and resorcinol type epoxy resin of liquid state are low in viscosity, it is preferable to use them with other epoxy resin in combination.

Furthermore, since a bisphenol A type epoxy resin which is solid at room temperature (about 25° C.) gives a cured resin of a structure of lower cross-linking density compared to a bisphenol A type epoxy resin which is liquid at room temperature (about 25° C.), said cured resin becomes lower in heat resistance, but becomes higher in toughness, and accordingly, it preferably is used in combination with a glycidyl amine type epoxy resin, a liquid bisphenol A type epoxy resin or a bisphenol F type epoxy resin.

An epoxy resin having a naphthalene skeleton gives a cured resin of low water absorption, and in addition, of high heat resistance. And, a biphenyl type epoxy resin, a dicyclopentadiene type epoxy resin, a phenolaralkyl type epoxy resin and a diphenyifluorene type epoxy resin also give cured resins of low water absorption, and are preferably used.

A urethane modified epoxy resin and an isocyanate modified epoxy resin give cured resins high in fracture toughness and strain, and they are preferably used.

These epoxy resins may be used singly or may be used by compounding appropriately. It is preferable to use them by compounding with at least a difunctional epoxy resin and an epoxy resin of trifunctional or more, since resin flowability and heat resistance after curing can be made compatible. In particular, a combination of a glycidyl amine type epoxy and a glycidyl ether type epoxy makes it possible that heat resistance and water resistance are compatible. And, compounding at least an epoxy resin which is liquid at room temperature and an epoxy resin which is solid at room temperature is effective to make tackiness properties and draping properties of prepreg appropriate.

The phenol novolac type epoxy resin or cresol novolac epoxy resin gives a cured resin excellent in heat resistance and water resistance, since they are excellent in heat resistance and low in water absorption. By using these phenol novolac type epoxy resin or cresol novolac epoxy resin, it is possible to control tackiness properties and draping properties of prepreg while improving heat resistance and water resistance.

As a hardener of the epoxy resin, it can be used if it is a compound having an active group capable of reacting with the epoxy group. As the hardener, a compound having amino group, acid anhydride group or azido group is suitable. As the hardener, more concretely, for example, dicyandiamide, diaminodiphenyl methane or various isomers of diaminodiphenyl sulfone, aminobenzoic acid esters, various acid anhydrides, a phenol novolac resin, a cresol novolac resin, a poly phenol compound, an imidazole derivative, an aliphatic amine, tetramethylguanidine, a thiourea addition amine, carboxylic acid anhydrides such as methylhexahydrophthalic acid anhydride, a carboxylic hydrazide, a carboxylic amide, a poly mercaptan and Lewis acid complexes such as $BF_3$ ethylamine complex, etc., are mentioned. These hardeners may be used alone or in combination.

By using an aromatic diamine as a hardener, a cured resin excellent in heat resistance can be obtained. In particular, various isomers of diaminodiphenyl sulfone are most appropriate for obtaining a cured resin excellent in heat resistance. As to an amount of addition of the aromatic diamine as a hardener, it is preferable to add in stoichiometrically equivalent amount, but in certain circumstances, for example, by using approximately 0.7 to 0.8 to the equivalent amount, a high modulus cured resin can be obtained.

Furthermore, by using a combination of dicyandiamide with a urea compound, for example, with 3,4-dichlorophenyl-1,1-dimethylurea, or by using an imidazole as a hardener, a high heat resistance and water resistance are achieved, even though being cured at a relatively low temperature. A curing by using an acid anhydride gives, compared to a curing by an amine compound, a cured resin of lower water absorption. Other than that, by using a latent hardener of them, for example, a microencapsulated hardener, storage stability of the prepreg is improved and, especially, tackiness properties or draping properties hardly change even when being left at room temperature.

Furthermore, it is also possible to compound these epoxy resin and hardener, or a prereaction product of a part of them in the composition. This method is effective for viscosity control or improvement of storage stability in some cases.

It is also preferable to use by mixing and dissolving a thermoplastic resin into the above-mentioned thermosetting resin. As such thermoplastic resins, in general, it is preferable to be a thermoplastic resin having, in the main chain, a bond selected from carbon-carbon bond, amide bond, imide bond, ester bond, ether bond, carbonate bond, urethane bond, thioether bond, sulfone bond and carbonyl bond, but a cross-linked structure may partially be contained. And, it may have crystallinity or may be amorphous. In particular, it is preferable that at least 1 kind resin selected from the group consisting of a polyamide, a polycarbonate, a polyacetal, polyphenyleneoxide, poly phenylene sulfide, a polyarylate, a polyester, a polyamideimide, a polyimide, a polyetherimide, a polyimide having phenyltrimethylindane structure, a polysulfone, a polyethersulfone, a polyetherketone, a polyetheretherketone, a polyaramid, a polyethernitrile and a polybenzimidazole is mixed and dissolved into the thermosetting resin.

As such thermoplastic resins, a commercially available polymer may be used, or a so-called oligomer of which molecular weight is lower than the commercially available polymer may be used. As the oligomer, an oligomer having, on its end or in molecular chain, a functional group capable of reacting with the thermosetting resin is preferable.

In case where a mixture of the thermosetting resin and the thermoplastic resin is used, a better result is obtained than a case where they are used alone. Brittleness of the thermosetting resin is covered by toughness of the thermoplastic resin, and in addition, difficulty of molding of the thermoplastic resin is covered by the thermosetting resin, and a base resin in good balance is obtained. A using ratio (parts by weight) of the thermosetting resin and the thermoplastic resin is, in view of the balance, preferably in the range of 100:2 to 100:50, and more preferably, in the range of 100:5 to 100:35.

Furthermore, in the above-mentioned thermosetting resin, for the purpose of improving conductivity of the carbon fiber reinforced composite material by increasing contact probability of the carbon fiber with each other, it is preferable to use by mixing a conductive filler. As such conductive fillers, a carbon black, a carbon nanotube, a vapor-grown carbon fiber (VGCF), a fullerene, a metal nanoparticle, etc., are mentioned, and they may be used alone or in combination. Among them, a carbon black which is cheap and high in effect is preferably used, and as such carbon blacks, for example, a furnace black, an acetylene black, a thermal black, a channel black, a ketjen black, etc., can be used, and a carbon black in which 2 kinds or more of them are blended is also preferably used. The conductive filler mentioned here is a conductive particle or fiber having an average diameter smaller (generally 0.1 times or less) than the average diameters of the conductive particle or fiber [D] and a conductive particle or fiber of which thermoplastic resin nucleus or core is coated with a conductive substance [E].

In an embodiment satisfying the item (1) of the present invention, since the thermoplastic resin particle or fiber [C] is used as an essential component, an excellent impact resistance can be realized. As materials for the thermoplastic resin particle or fiber [C] of the present invention, the same materials as the various thermoplastic resins above-exemplified as the thermoplastic resins to be used by mixing and dissolving into the thermosetting resin can be used. Among them, polyamide which can greatly improve impact resistance by its excellent toughness is most preferable. Among the polyamides, Nylon 12, nylon 11 or nylon 6/12 copolymer are preferable, since they are especially good in adhesion strength with the thermosetting resin [B], and delamination strength of the carbon fiber reinforced composite material at the time of drop impact is high, and effect of impact resistance improvement is high.

In case where a thermoplastic resin particle is used as the [C], as the thermoplastic resin particle shape, spherical, non-spherical, porous, spicular, whisker-like or flaky shape may also be acceptable, but spherical shape is preferable since it is excellent in impregnating property to carbon fibers because it does not lower flow ability of the thermosetting resin, or since an interlayer delamination, generated by a localized impact when a drop impact (or localized impact) is added to the carbon fiber reinforced composite material, is more reduced, and the delamination parts, caused by the above-mentioned localized impact, which are starting points of breakage by stress concentration in case where a stress is added to the carbon fiber reinforced composite material, are not many, and a carbon fiber reinforced composite material which realizes a high impact resistance can be obtained.

In case where a thermoplastic resin fiber is used as the [C], as a shape of the thermoplastic resin fiber, both of short fiber or long fiber can be used. In case of short fiber, a method in which short fibers are used in the same way as particles as shown in JP-02-69566A, or a method in which short fibers are used after processed into a mat is possible. In case of long fiber, a method in which long fibers are arranged in parallel on a prepreg surface as shown in JP-04-292634A, or a method in which they are arranged randomly as shown in W094/016003 is possible. Furthermore, it can be used after processed into sheet-like base materials such as a woven fabric as shown in JP-H02-32843A, a non-woven fabric as shown in W094016003A, or a knitted fabric. And, a short fiber chip, a chopped strand, a milled fiber, or a method in which short fibers are made into a spun yarn and arranged in parallel or random, or processed into a woven fabric or a knitted fabric can also be employed.

In the present invention, in case where a conductive particle is used as the [D], the conductive particle may be at least a particle which acts as an electrically good conductor, and it is not limited to those consisting only of a conductor. Preferably, it is a particle of which volume resistivity is 10 to $10^{-9}$ $\Omega$cm, more preferably 1 to $10^{-9}$ $\Omega$cm and still more preferably $10^{-1}$ to $10^{-9}$ $\Omega$. When the volume resistivity is too high, in the carbon fiber reinforced composite material, a sufficient conductivity may not be obtained. As the conductive particles, for example, a metal particle, conductive polymer particles such as polyacetylene particle, polyaniline particle, polypyrrole particle, polythiophene particle, polyisothianaphthene particle or polyethylenedihydroxythiophene particle, or a carbon particle, and other than that, a particle of which nucleus of inorganic material is coated with a conductive substance or a particle of which nucleus of organic material is coated with a conductive substance can be used. Among them, since they exhibit a high conductivity and stability, the carbon particle, the particle of which nucleus of inorganic material is coated with a conductive substance or the particle of which nucleus of organic material is coated with a conductive substance are especially preferably used.

In particular, like the embodiment satisfying the item (2) of the present invention which is mentioned later, when a thermoplastic resin is used as the organic material and the particle of which thermoplastic resin nucleus is coated with a conductive substance is used, it is preferable since a still more excellent impact resistance can be realized in the carbon fiber reinforced composite material to be obtained.

In case where a conductive fiber is used as the [D] in the present invention, the conductive fiber may be at least a fiber which acts as an electrically good conductor, and it is not limited to those consisting only of a conductor. Preferably, it is a fiber of which volume resistivity is 10 to $10^{-9}$ $\Omega$cm, more preferably 1 to $10^{-9}$ $\Omega$cm, and still more preferably $10^{-1}$ to $10^{-9}$ $\Omega$. When the volume resistivity is too high, a sufficient conductivity may not be obtained in the carbon fiber reinforced composite material. As the conductive fiber, for example, a metal fiber, a carbon fiber, a fiber of which core of inorganic material is coated with a conductive substance or a fiber of which core of organic material is coated with a conductive substance, etc., can be used. In particular, like the embodiment satisfying the item (2) of the present invention which is mentioned later, when a thermoplastic resin is used as the organic material, and a fiber of which core of thermoplastic resin is coated with a conductive substance is used, a still more excellent impact resistance can be realized in the carbon fiber reinforced composite material to be obtained.

As to the volume resistivity mentioned here, a sample is set to a cylindrical cell having 4 probe electrode, thickness and resistivity value of the sample are measured in the condition in which a pressure of 60 MPa is added to the sample, and a value calculated from them is taken as the volume resistivity.

In the conductive particle or fiber [D] of the type coated with the conductive substance, the conductive particle or fiber is constituted with the inorganic material or organic material which is the nucleus or core and the conductive layer consisting of the conductive substance, and as desired, an adhesive layer which is mentioned later may be provided between the nucleus or core and the conductive layer.

In the conductive particle or fiber [D] of the type coated with the conductive substance, as the inorganic material to be used as the nucleus or core, an inorganic oxide, an inorganic-organic complex, and carbon, etc., can be mentioned.

As the inorganic oxide, for example, a single inorganic oxide and a complex inorganic oxide of 2 kinds or more such as of silica, alumina, zirconia, titania, silica.alumina or silica.zirconia are mentioned.

As the inorganic-organic complex, for example, polyorganosiloxane obtainable by hydrolysis of metal alkoxide and/or metal alkylalkoxide or the like are mentioned.

Furthermore, as the carbon, a crystalline carbon or an amorphous carbon is preferably used. As the amorphous carbon, for example, "Bellpearl" (trademark) C-600, C-800, C-2000 (produced by Kanebo, Ltd.), "NICABEADS" (trademark) ICB, PC, MC (produced by Nippon Carbon Co. Ltd.) or the like are concretely mentioned.

In the conductive particle or fiber [D] of a type coated with a conductive substance, in case where an organic material is used as a nucleus or core, as the organic material used as the nucleus or core, thermosetting resins such as an unsaturated polyester resin, a vinyl ester resin, an epoxy resin, a benzoxazine resin, a phenol resin, an urea-formaldehyde resin, a melamine formaldehyde resin and a polyimide resin, thermoplastic resins such as a polyamide resin, a phenol resin, an amino resin, an acrylic resin, an ethylene polyvinyl acetate resin, a polyester resin, an urea-formaldehyde resin, a melamine formaldehyde resin, an alkyd resin, a polyimide resin, an polyurethane resin, and divinylbenzene resin are mentioned. And, 2 kinds or more of the materials mentioned here may be complexed and used. Among them, an acrylic resin or divinylbenzene resin having an excellent heat resistance, and a polyamide resin having an excellent impact resistance are preferably used.

In the embodiment satisfying the item (2) of the present invention, since the conductive particle or fiber of which thermoplastic resin nucleus or core is coated with a conductive substance [E] is used as an essential component, even when the thermoplastic resin particle or fiber [C] is not added, it is possible to impart a high impact resistance and conductivity to the carbon fiber reinforced composite material. As the thermoplastic resin used as a material of the nucleus or core of the conductive particle or fiber [E] used in the present invention, it is possible to use the same ones as the above-exemplified various kinds of thermoplastic resin which are used as the thermoplastic resin by mixing and dissolving in the thermosetting resin. Among them, it is preferable to use a thermoplastic resin of strain energy release rate ($G_{1c}$) of 1500 to 50000 $J/m^2$ as the material of nucleus or core. More preferably, it is 3000 to 40000 $J/m^2$, still more preferably, 4000 to 30000 $J/m^2$. When the strain energy release rate ($G_1$) is too small, an impact resistance of the carbon fiber reinforced composite material may be insufficient, and when it is too large, a stiffness of the carbon fiber reinforced composite material may decrease. As such thermoplastic resins, for example, a polyamide, a polyamideimide, a polyethersulfone, a polyetherimide, etc., are preferably used, and a polyamide is especially preferable. Among polyamides, nylon12, nylon11 or nylon6/12 copolymer is preferably used. The evaluation of $G_{1c}$ is, by using a resin plate prepared by molding the thermoplastic resin which is the material of nucleus or core of the [E], carried out according to the compact tension method or the double tension method prescribed in ASTM D 5045-96.

In case where a conductive particle of which thermoplastic resin nucleus is coated with a conductive substance is used as the [E], as the thermoplastic resin particle shape, spherical, nonspherical, porous, spicular, whisker-like, or flaky shaped may also be acceptable, but spherical shape is preferable since it is excellent in impregnating property to carbon fibers because it does not lower flow ability of the thermosetting resin. And, since an interlayer delamination, generated by a localized impact when a drop impact (or localized impact) is added to the carbon fiber reinforced composite material, is more reduced, the delamination parts, caused by the above-mentioned localized impact, which are starting points of breakage by stress concentration in case where a stress is added to the carbon fiber reinforced composite material, are not many, and since a contact probability with the carbon fibers in the laminate layer is high to make a conductive paths easy to be formed, it is preferable since it is possible to obtain a carbon fiber reinforced composite material which realizes a high impact resistance and conductivity.

In case where the conductive fiber of which thermoplastic resin core is coated with a conductive substance is used as the [E], as a shape of the core of thermoplastic resin fiber, either of short fiber or long fiber can be used.

In case of the short fiber, as shown in JP-H02-69566A, a method of using the short fiber like a particle, or a method of using it by processing it into a mat is possible. In case of the long fiber, as shown in JP-H04-292634A, a method of arranging long fibers in parallel on a prepreg surface, or as shown in WO94016003, a method of arranging in random is possible. Furthermore, it is also possible to use it by processing it into sheet-like bases such as a woven fabric as shown in JP-H02-32843A, or a non-woven or knitted fabric as shown in WO94016003. And, methods of using as a short fiber chip, a chopped strand, a milled fiber, or using by making the short fiber into a spun yarn, by arranging in parallel or random, or by processing into a woven or knitted fabric, can also be employed.

At coating the core of thermoplastic resin fiber with the conductive substance, a method of coating with the conductive substance after the core of thermoplastic resin fiber is processed into the above-mentioned shape, or a method of processing into the above-mentioned shape after the core of thermoplastic resin fiber is coated with the conductive substance, are mentioned. Either method is preferably employed to the short fiber, long fiber, chopped strand, and milled fiber. In case of the woven fabric, knitted fabric or non-woven fabric, a method of processing them into the above-mentioned shape after the core of thermoplastic resin fiber is coated with the conductive substance is preferably used. It is because, in case of the woven fabric, knitted fabric or non-woven fabric, when the core of thermoplastic resin particle is coated with the conductive substance after processed into such shapes, a coating unevenness is generated and a conductivity of the [E] may decrease, and it is not employed preferably.

In the conductive particle or fiber of which thermoplastic resin nucleus or core is coated with a conductive substance [E], as the above-mentioned conductive material to coat the nucleus or core, a metal or carbon can be mentioned. And, in such [E], a conductive layer is constituted with the above-mentioned conductive substance on surface of the thermoplastic resin nucleus or core, but such conductive layer may be a continuous film of metal or carbon, or may be an aggregate of fibrous or particulate conductive substance such as a conductive fiber, a carbon black or a metal fine particle. And, an adhesion layer which is mentioned later may be provided between the thermoplastic resin which is the nucleus or core and the conductive layer.

As the conductive substance constituting the conductive layer in the conductive particle or fiber [D] of the type coated with a conductive substance, and in the conductive particle or fiber of which thermoplastic resin nucleus or core is coated with a conductive substance [E], materials which act as an electrically good conductor are acceptable and not limited to those consisting only of a conductor. Preferably, it is a material of which volume resistivity is 10 to $10^{-9}$ Ωcm, more preferably 1 to $10^{-9}$ Ωcm, still more preferably $10^{-1}$ to $10^{-9}$ cm. When the volume resistivity is too high, in the carbon fiber reinforced composite material, a sufficient conductivity may not be obtained. For example, carbon or metal are mentioned, and such a conductive layer may be a continuous film of a carbon or metal, or an aggregate of fibrous or particulate conductive substances.

In case where a carbon is used as the conductive substance, carbon blacks such as a channel black, a thermal black, a furnace black, a ketjen black, and a hollow carbon fiber, etc., are preferably used. Among them, a hollow carbon fiber is preferably used, and its outer diameter is preferably 0.1 to 1000 nm, more preferably 1 to 100 nm. When the outer diameter of the hollow carbon fiber is too small or too large, it may be difficult to produce such hollow carbon fibers.

The above-mentioned hollow carbon fiber may have a graphite layer formed on its surface. At that time, a total number of the constituting graphite layer is, preferably 1 to 100 layers, more preferably 1 to 10 layers, still more preferably, 1 to 4 layers, and especially preferable one has 1 to 2 layers.

In case where a metal is used as the conductive substance, any metal is acceptable, but preferably, its normal electrode potential is −2.0 to 2.0V, and more preferably −1.8 to 1.8V. When the normal electrode potential is too low, it is unstable and may not be preferable in view of safety, and when it is too high, the processability or productivity may decrease. Here, the normal electrode potential is expressed by difference between the electrode potential when a metal is immersed in a solution containing its metal ion and the normal hydrogen electrode (platinum electrode immersed in 1N HCl solution which contact with hydrogen at 1 atm.) potential. For example, Ti: −1.74V, Ni: −0.26V, Cu: 0.34V, Ag: 0.80V and Au: 1.52V.

In case where the above-mentioned metal is used, it is preferable to be a metal used by plating. As preferable metals, since a corrosion based on potential difference with carbon fiber can be prevented, platinum, gold, silver, copper, tin, nickel, titanium, cobalt, zinc, iron, chromium, aluminum, etc., are used and among them, since a high conductivity of volume resistivity 10 to $10^{-9}$ Ωcm and stability are exhibited, platinum, gold, silver, copper, tin, nickel, or titanium are especially preferably used. Whereas, these metals may be used alone, or may be used as an alloy of which main components are these metals.

As methods for carrying out metal plating by using the above-mentioned metal, a wet plating and a dry plating are preferably used. As the wet plating, methods such as electroless plating, displacement plating and electroplating can be employed, but among them, since it is possible to carry out plating to a nonconductor, a method by the electroless plating is preferably used. As the dry plating, methods such as vacuum vapor deposition, plasma CVD (chemical vapor deposition), optical chemical vapor deposition, ion plating and sputtering can be employed, but since it is possible to obtain an excellent close contactness at a low temperature, a method by the sputtering is preferably employed.

Furthermore, the metal plating may be a coating film of a single metal or a coating film of a plurality of layers of a plurality of metals. In case where metal plating is carried out, it is preferable that the outermost surface is formed with a plating film of a layer consisting of gold, nickel, copper or titanium. By making the outermost surface with the above-mentioned metal, it is possible to reduce a connection resistance value or to stabilize the surface. For example, when a gold layer is formed, a method in which a nickel layer is formed by electroless nickel plating, and after that, a gold layer is formed by a displacement gold plating is preferably employed.

Furthermore, it is also preferable to use a metal fine particle as the conductive substance constituting the conductive layer. In this case, as a metal to be used as the metal fine particle, in order to prevent a corrosion due to potential difference with the carbon fiber, platinum, gold, silver, copper, tin, nickel, titanium, cobalt, zinc, iron, chromium, aluminum, or an alloy containing these metals as main components, or tin oxide, indium oxide, indium.tin oxide (ITO), etc., are preferably used. Among them, because of high conductivity and stability, platinum, gold, silver, copper, tin, nickel, titanium or an alloy containing them as main components are especially preferably used. Whereas, at this time, the fine particle means, a particle having an average diameter smaller (usually 0.1 times or less is meant) than the average diameter of the conductive particle or fiber [D] or of the conductive particle or fiber of which thermoplastic resin nucleus or core is coated with a conductive substance [E].

As a method of coating the nucleus or core with the above-mentioned metal fine particle, a mechanochemical bonding technique is preferably used. The mechanochemical bonding is a method of creating a composite fine particle in which a plural of different material particles are mechanochemically bonded in a molecular level by adding a mechanical energy to create a strong nano bond in their interface, and in the present invention, the metal fine particle is bonded to the inorganic material or the nucleus or core of organic material, to coat said nucleus or core with the metal fine particle.

In case where the metal fine particle is coated to the nucleus of inorganic material or organic material (including thermoplastic resins), a particle diameter of this metal fine particle is preferably 1/1000 to 1/10 times of average particle diameter of the nucleus, more preferably 1/500 to 1/100 times. A metal fine particle of a too small particle diameter is difficult to be produced in some cases, and on the contrary, when the particle diameter of metal fine particle is too large, a coating unevenness arises in some cases. Furthermore, in case where a metal fine particle is coated to a core of inorganic material or organic material, a particle diameter of this metal fine particle is preferably 1/1000 to 1/10 times of average fiber diameter of the core, more preferably 1/500 to 1/100 times. A metal fine particle of a too small particle diameter is difficult to be produced in some cases, and on the contrary, when the particle diameter of metal fine particle is too large, a coating unevenness arises in some cases.

In the conductive particle or fiber [D] and the conductive particle or fiber of which thermoplastic resin nucleus or core is coated with a conductive substance [E] which are types coated with a conductive substance, an adhesive layer may not be present between the nucleus or core and the conductive layer, but it may be present in case where the nucleus or core and the conductive layer are easy to be peeled off. As main component of the adhesive layer of this case, a vinyl acetate resin, an acrylic resin, a vinyl acetate-acrylic resin, a vinyl acetate-vinyl chloride resin, an ethylene polyvinyl acetate resin, an ethylene polyvinyl acetate resin, an ethylene-acrylic resin, a polyamide, a polyvinyl acetal, a polyvinyl alcohol, a polyester, a polyurethane, a urea resin, melamine formaldehyde resin, a phenol resin, a resolcinol resin, an epoxy resin, a polyimide, a natural rubber, a chloroprene rubber, a nitrile rubber, an urethane rubber, an SBR, a regenerated rubber, a butyl rubber, an aqueous vinylurethane, an a-olefin, a cyanoacrylate, a modified acrylic resin, an epoxy resin, an epoxy-phenol, a butylal-phenol, a nitrile-phenol, etc., are preferable, and among them, a vinyl acetate resin, an acrylic resin, an vinyl acetate-acrylic resin, a vinyl acetate-vinyl chloride resin, an ethylene polyvinyl acetate resin, an ethylene polyvinyl acetate resin, an ethylene-acrylic resin and epoxy resin or the like are mentioned.

In the conductive particle or fiber [D] which is the type coated with a conductive substance and the conductive particle or fiber of which thermoplastic resin nucleus or core is coated with a conductive substance [E], as the conductive particle or fiber which is coated with the conductive substance, it is good to use those of which volume ratio expressed by [volume of nucleus or core]/[volume of conductive layer] is preferably 0.1 to 500, more preferably 1 to 300, still more preferably 5 to 100. When such a volume ratio is less than 0.1, not only a weight of the obtained carbon fiber reinforced composite material increases, but also, in the resin compounding, a uniform dispersion may be impossible, and on the contrary, when it exceeds 500, in the obtained carbon fiber reinforced composite material, a sufficient conductivity may not be obtained.

It is preferable that a specific gravity of the conductive particle or fiber used in the present invention (the conductive particle or fiber [D] and the conductive particle or fiber of which thermoplastic resin nucleus or core is coated with a conductive substance [E]) is at most 3.2. When the specific gravity of the conductive particle or fiber exceeds 3.2, not only a weight of the obtained carbon fiber reinforced composite material increases, but also, in the resin compounding, a uniform dispersion may be impossible. From such a viewpoint, the specific gravity of the conductive particle or fiber is preferably, 0.8 to 2.2. When the specific gravity of the conductive particle or fiber is less than 0.8, in the resin compounding, a uniform dispersion may be impossible.

As the conductive particle or fiber [D] and the conductive particle or fiber of which thermoplastic resin nucleus or core is coated with a conductive substance [E], in case where a particle is used, its shape may be spherical, nonspherical, porous, spicular, whisker shaped or flaky, but a spherical one is more excellent in impregnating property into the carbon fiber since it does not impair flow ability of the thermosetting resin. And, since an interlayer delamination, generated by a localized impact when a drop impact (or localized impact) is added to the carbon fiber reinforced composite material, is more reduced, the delamination parts, caused by the above-mentioned localized impact, which would be starting points of breakage by stress concentration in case where a stress is added to the carbon fiber reinforced composite material, are not many, and since a contact probability with the carbon fibers in the laminate layer is high to make a conductive paths easy to be formed, it is preferable in view of capability of obtaining a carbon fiber reinforced composite material which realizes a high impact resistance and conductivity.

In case where a fiber is used as the conductive particle or fiber [D] and the conductive particle or fiber of which thermoplastic resin nucleus or core is coated with a conductive substance [E], as its shape, both of short fiber or long fiber can be used. In case of short fiber, a method of using the short fiber in the same way as particle as shown in JP-H02-69566A or a method of using it by processing it into a mat, is possible. In case of long fiber, a method of arranging long fibers in parallel on a prepreg surface as shown in JP-H04-292634A, or a method of arranging randomly as shown in WO94016003 is possible. Furthermore, it can also be used by processing it into sheet-like bases such as a woven fabric as shown in JP-H02-32843A, a non-woven fabric, or knitted fabric as shown in WO94016003. And, a short fiber chip, a chopped strand, a milled fiber, or a method in which short fibers are made into a spun yarn and arranged in parallel or random, or processed into a woven fabric or a knitted fabric can also be employed. In the conductive fiber [D] and the conductive fiber of which core of thermoplastic resin fiber is coated with a conductive substance [E] which is a type coated with a conductive substance, a method in which, at coating a material of the core with the conductive substance, after the core of conductive fiber is processed into the above-mentioned shape, the conductive substance is coated, or a method in which, after coating the core of conductive fiber with the conductive substance, it is processed into the above-mentioned shape, are mentioned. For the short fiber, long fiber, chopped strand, milled fiber, etc., both methods are preferably employed. For the woven fabric, knitted fabric or non-woven fabric, a method in which, after the conductive substance is coated to the core of conductive fiber, it is processed into the above-mentioned shape, is preferably employed. A method in which, after the conductive fiber core is processed into the above-mentioned shape, it is coated with the conductive substance is not preferable since a coating unevenness arises and a conductivity of the conductive fiber used as the [D] and [E] may decrease.

In the embodiment the present invention satisfying the item (1) (use of the thermoplastic resin particle or fiber together with the conductive particle or fiber), a weight ratio expressed by [compounding amount of thermoplastic resin particle or fiber (parts by weight)]/[compounding amount of conductive particle or fiber (parts by weight)] is 1 to 1000, preferably 10 to 500 and more preferably 10 to 100. It is because, when the weight ratio becomes less than 1, a sufficient impact resistance cannot be obtained in the obtained carbon fiber reinforced composite material, and when the weight ratio becomes more than 1000, a sufficient conductivity cannot be obtained in the obtained carbon fiber reinforced composite material.

In the embodiment of the present invention satisfying the item (1) (use of the thermoplastic resin particle or fiber together with the conductive particle or fiber), it is preferable that an average diameter of the conductive particle or fiber [D] (average particle diameter or average fiber diameter) is same or more than an average diameter of the thermoplastic resin particle or fiber [C] (average particle diameter or average fiber diameter), and the average diameter is at most 150 μm. In case where the average diameter of the conductive particle or fiber

[D] is smaller than the average diameter of the thermoplastic resin particle or fiber [C], the conductive particle or fiber [D] is buried in interlayer of the thermoplastic resin particle or fiber [C] which is insulative, and a conductive path between the carbon fiber in the layer and the conductive particle or fiber [D] is difficult to be formed, and a sufficient improving effect of conductivity may not be obtained.

Furthermore, in the present invention, it is preferable that average diameters of the thermoplastic resin particle or fiber [C], the conductive particle or fiber [D] and the conductive particle or fiber of which thermoplastic resin nucleus or core is coated with a conductive substance [E] are at most 150 µm. When the average diameter exceeds 150 µm, since arrangement of the reinforcing fibers is disturbed, or, in case where a particle layer is formed around the prepreg surface, the interlayer of the obtained composite material becomes thicker than necessary as mentioned later, physical properties may decrease when it is formed into a composite material. The average diameter is, preferably 1 to 150 µm, more preferably 3 to 60 µm, especially preferably 5 to 30 µm. When the average diameter is too small, the particle penetrates between fibers of the reinforcing fiber and not localizes in the interlayer portion of the prepreg laminate, and an effect of the presence of particle is not sufficiently obtained, and an impact resistance may decrease.

Here, method of determination of the average diameters in case of the particle or in case of the fiber are explained respectively.

As to the average diameter of the particle (average particle diameter), for example, it can be determined as the average value (n=50) of the particle diameter by photographing the particle at a magnification of 1000 times or more by a microscope such as a scanning electron microscope, selecting a particle arbitrarily, and taking a diameter of circumscribed circle of the particle as the particle diameter. And, when the volume ratio expressed by [volume of nucleus]/[volume of conductive layer] of the conductive particle coated with a conductive substance is determined, at first, an average particle diameter of nucleus of the conductive particle is determined by the above-mentioned method, or an average diameter of the conductive particle (average particle diameter) is determined by the above-mentioned method. After that, a cross-section of the conductive particle coated with a conductive substance is photographed by a scanning type microscope at a magnification of 10,000 times, the thickness of conductive layer is measured (n=10), and its average value is calculated. Such a determination is carried out for the above-mentioned arbitrarily selected conductive particles (n=50). The average particle diameter of nucleus of the conductive particle and 2 times of the average value of thickness of the conductive layer are added together and taken as the average diameter of conductive particle (average particle diameter), or the average diameter of conductive particle (average particle diameter) minus 2 times of the average value of thickness of the conductive layer is taken to determine the average diameter of nucleus of the conductive particle (average particle diameter). And, by using the average diameter of nucleus of the conductive particle (average particle diameter) and the average diameter of conductive particle (average particle diameter), it is possible to calculate a volume ratio expressed by [volume of nucleus]/[volume of conductive layer].

As to the average diameter of fiber (average fiber diameter), for example, by a microscope such as a scanning electron microscope, a fiber cross-section is photographed at a magnification of 1000 times or more, a fiber cross-section is arbitrarily selected, a diameter of circumscribed circle of the fiber cross-section is take as the fiber diameter, and it is possible to obtain an average value (n=50) of the fiber diameter. And, when the volume ratio expressed by [volume of core]/[volume of conductive layer] of the conductive fiber coated with the conductive substance is determined, first, the average fiber diameter of core of the conductive fiber is measured by the above-mentioned means, or the average diameter of the conductive fiber (average fiber diameter) is measured by the above-mentioned means. After that, a cross-section of the conductive fiber coated with the conductive substance is photographed by a scanning electron microscope at a magnification of 10,000 times, a thickness of conductive layer is measured (n=10), and its average value is calculated. Such a measurement is carried out for the above-mentioned arbitrarily selected conductive fibers (n=50).

The average diameter of core of the conductive fiber (average fiber diameter) and 2 times of the average value of thickness of the conductive layer are added and taken as the average diameter of the conductive fiber (average fiber diameter), or the average diameter of the conductive fiber (average fiber diameter) minus 2 times of the average value of thickness of the conductive layer is taken to determine the average diameter of core of the conductive fiber (average fiber diameter). And, based on the average diameter of core of the conductive fiber (average fiber diameter) and the average diameter of the conductive fiber (average fiber) diameter, it is possible to calculate the volume ratio expressed by [volume of core]/[volume of conductive layer].

In the prepreg of the present invention, the carbon fiber weight ratio is preferably 40 to 90%, more preferably 50 to 80%. When the carbon fiber weight ratio is too low, a weight of the obtained composite material becomes too heavy, an advantage of the fiber reinforced composite material that is excellent in specific strength and specific modulus may be impaired, and when the carbon fiber weight ratio is too high, a defective impregnation of resin occurs, the obtained composite material may have many voids, and its mechanical characteristics may significantly decrease.

In the prepreg of the present invention, it is preferable that every one of the thermoplastic resin particle or fiber [C], conductive particle or fiber [D] and the conductive particle or fiber of which thermoplastic resin nucleus or core is coated with a conductive substance [E] localizes around surface portion of the prepreg. In other words, it is preferable that a layer abundant in the particles or fibers of the above-mentioned [C], [D] and [E], that is, a layer in which, when the cross-section is observed, a condition capable of confirming clearly that the particles or fibers of the above-mentioned [C], [D] and [E] localizes (hereafter, may be referred to as inter-formative layer.), is formed around the surface portion of the prepreg. By this, in case where prepregs are made into a carbon fiber reinforced composite material by laying-up and by curing the matrix resin, an interlayer in which the particles or fibers of the above-mentioned [C], [D] and [E] are localized between carbon fiber layers is formed, and by that, since toughness of the carbon fiber interlayer increases, and simultaneously, the particles or fibers of the above-mentioned [D] and [E] contained in the inter-formative layer can form a conductive path in the carbon fiber interlayer, high level impact resistance and conductivity are exhibited in the obtained carbon fiber reinforced composite material.

FIG. 1 is an example of a cross-sectional view of a representative prepreg of the present invention. The present invention is explained in more detail with reference to FIG. 1.

The prepreg of the present invention shown in FIG. 1 has, between two of the carbon fiber layer 1 constituted with the carbon fiber 5 and the thermosetting resin 6, the inter-formative layer 2 containing the thermosetting resin 6, the thermoplastic resin particle 3 and the conductive particle 4. By forming the inter-formative layer 2, since toughness of the carbon fiber interlayer increases, and simultaneously, the conductive particle 4 contained in the inter-formative layer 2 can form a conductive path in the carbon fiber interlayer, a high level impact resistance and conductivity are exhibited in the obtained carbon fiber reinforced composite material.

From such a viewpoint, it is preferable that the above-mentioned inter-formative layer is present, with respect to the prepreg thickness 100%, in the range of 20% thickness from at least one side surface of the prepreg, more preferably, in the range of 10% thickness. And, it is preferable that the above-mentioned inter-formative layer is present, in view of improving convenience at producing the carbon fiber reinforced composite material, on both of front and back sides of the prepreg. It is preferable that 90 to 100 wt %, preferably 95 to 100 wt % of the particles or fibers of the above-mentioned [C], [D] and [E], with respect to the respective total amounts, localize in the above-mentioned inter-formative layer.

The thickness of the above-mentioned inter-formative layer with respect to the prepreg and the containing ratio of the particles or fibers of the above-mentioned [C], [D] and [E] contained in said inter-formative layer can be evaluated, for example, by the following method.

As to the thickness of the inter-formative layer with respect to the prepreg, a plural of laid-up prepregs are contacted closely by holding between 2 smooth surface polytetrafluoroethylene resin plates, and gelled and cured by gradually raising temperature to curing temperature in 7 days to prepare a platy cured prepreg product. By using this cured prepreg, a magnified photograph of the cross-section is taken. By using this cross-section photograph, a thickness of the inter-formative layer with respect to the prepreg is measured. In concrete, on a photograph such as shown in FIG. 1, it is measured at arbitrarily selected at least 10 positions of the inter-formative layer 2 between the carbon fiber layers 1, and their average is taken as a thickness of the inter-formative layer.

As to the containing ratio of particles or fibers of the above-mentioned [C], [D] and [E] contained in the inter-formative layer, a single layer prepreg is closely contacted by holding between 2 smooth surface polytetrafluoroethylene resin plates, gelled and cured by gradually raising temperature to curing temperature in 7 days to prepare a platy cured prepreg product. On both sides of this prepreg, 2 lines which are parallel to the surface of cured product of the prepreg are drawn at positions of 20% depth, with respect to the thickness, from the surface of the cured product. Next, a total area of the above-mentioned particle or fiber present between the prepreg surface and the above-mentioned lines, and a total area of the particle or fiber present throughout the thickness of prepreg are determined, and calculate the containing ratio of the particle or fiber present in 20% depth range from the prepreg surface, with respect to the prepreg thickness 100%. Here, the total area of the above-mentioned particle or fiber is determined by clipping the particle or fiber portion from the cross-section photograph and weighing its weight. In case where a distinction of particles dispersed in the resin after taking a photograph is difficult, a means of dyeing the particle can also be employed.

Furthermore, in the present invention, it is preferable that a total amount of the thermoplastic resin particle or fiber [C], the conductive particle or fiber [D] and the conductive particle or fiber of which thermoplastic resin nucleus or core is coated with a conductive substance [E] is, with respect to the prepreg, in the range of 20 wt % or less. When the total amount of the particles or fibers of the above-mentioned [C], [D] and [E] exceeds, with respect to the prepreg, 20 wt %, not only it becomes difficult to mix with the base resin, but also tack and draping properties of the prepreg may decrease. That is, in order to impart impact resistance while maintaining characteristics of the base resin, it is preferable that the total amount of the particles or fibers of the above-mentioned [C], [D] and [E] is, with respect to the prepreg, 20 wt % or less, more preferably 15 wt % or less. In order to make handling of the prepreg still more excellent, it is more preferable to be 10 wt % or less. It is preferable that the total amount of the particles or fibers of the above-mentioned [C], [D] and [E] is, in order to achieve a high impact resistance and conductivity, with respect to the prepreg, 1 wt % or more, more preferably 2 wt % or more.

In the present invention, among the conductive particle or fiber [D] and the conductive particle or fiber of which thermoplastic resin nucleus or core is coated with a conductive substance [E], there are some of which adhesion with the thermosetting resin [B] are low, but when those subjected to a surface treatment are used, it is possible to realize a strong adhesion with the thermosetting resin, and a further improvement of impact resistance becomes possible. From such a viewpoint, it is preferable to use those subjected to at least one kind of treatment selected from the group consisting of a coupling treatment, an oxidation treatment, an ozonation, a plasma treatment, a corona treatment, and a blast treatment. Among them, those subjected to a surface treatment of a coupling treatment, an oxidation treatment or a plasma treatment which is capable of forming a chemical bond or hydrogen bond with the thermosetting resin is preferably used since a strong adhesion with the thermosetting resin can be realized.

Furthermore, at the above-mentioned surface treatment, in order to shorten the surface treatment time or to assist the dispersion of the conductive particle or fiber [D] and the conductive particle or fiber of which thermoplastic resin nucleus or core is coated with a conductive substance [E], it is possible to carry out the surface treatment while applying heat and ultrasonic wave. It is preferable that the heating temperature is at most 200° C., preferably 30 to 120° C. That is, when the temperature is too high, a bad smell may be generated to worsen the environment or operation cost may increase.

As a coupling agent used for the coupling treatment, a silane-based, a titanium-based or an aluminum-based one is used, and these coupling agent may be used alone or in combination. When a coupling agent is not appropriate, since adhesion with the treated particle or fiber and the thermosetting resin becomes insufficient, impact resistance may decrease. In order to avoid such a problem, it is preferable to use a coupling agent having a strong affinity to, or capable of chemical bonding to realize a strong adhesion with a thermosetting resin to be used. In order to increase the affinity to the thermosetting resin, it is preferable to select a coupling agent having a substituted group of which molecular structure or polarity is similar to the molecular structure or polarity of a thermosetting resin to be used.

In order to surely increase adhesion further, it is preferable to use a coupling agent capable of forming a chemical bond with the thermosetting resin which is the matrix resin. In case where a resin capable of radical polymerization such as an unsaturated polyester resin, a diallyl phthalate resin or a maleimide resin is the matrix resin, a coupling agent having a substituted group with a double bond such as vinyl group, allyl group, acryloyl group, methacryloyl group, cyclohexenyl group, in case where an epoxy resin is the matrix resin, a coupling agent having epoxy group, phenolic hydroxyl group, carboxyl group, mercapto group, amino group or a monosubstituted amino group, in case where a phenol resin is the matrix resin, a coupling agent having epoxy group or phenolic hydroxyl group, in case where a polyurethane resin is the matrix resin, a coupling agent having hydroxyl group, amino group or a monosubstituted amino group, in case where a melamine formaldehyde resin or a urea-formaldehyde resin is the matrix resin, a coupling agent having amide group, ureido group, amino group or a monosubstituted amino group, in case where a maleimide resin is the matrix resin, other than a coupling agent having a double bond, a coupling agent having amino group or a monosubstituted amino group, in case where a cyanate resin is the matrix resin, a coupling agent having carboxyl group, epoxy group, hydroxyl group, amino group or a monosubstituted amino group, can preferably be used.

As a coupling treatment, silane coupling treatment is preferable since coupling agents having various functional groups are easily available. As concrete examples of the silane coupling agent, as aminosilanes, 3-aminopropyl trimethoxysilane, 3-aminopropyl triethoxysilane, 3-(2-aminoethyl) aminopropyl trimethoxysilane, 3-(phenylamino)propyl trimethoxysilane, 3-(2-aminoethyl) amino-3-(2-aminoethyl) aminopropylmethyl dimethoxysilane, etc., as epoxysilanes, 3-glycidoxypropyl trimethoxysilane, 3-glycidoxypropyl triethoxysilane, 3-glycidoxypropylmethyl dimethoxysilane, 2-(3,4-epoxycyclohexyl) ethyltrimethoxysilane, γ-methacryloxypropyl trimethoxysilane, etc., as vinylsilanes, vinyltrichlorosilane, vinyltrimethoxysilane, vinyltriethoxysilane, vinyltris(2-methoxyethoxy)silane, vinyltriacetoxysilane, etc., can be mentioned. In particular, a silane coupling agent having an epoxy group, amino group or a monosubstituted amino grouping in molecule is especially preferably used since it is applicable to a wide range of resin and its reactivity is also high.

In the present invention, in case where the conductive particle or fiber [D] and the conductive particle or fiber of which thermoplastic resin nucleus or core is coated with a conductive substance [E] (hereafter, may be referred to as substance to be treated) are subjected to a coupling treatment, it is preferable to compound a coupling agent, with respect to these particle or fiber 100 parts by weight, preferably 0.01 to 30 parts by weight, more preferably 0.1 to 10 parts by weight. When the compounding amount of the coupling agent is too small, an adhesion with the thermosetting resin may not be sufficiently exhibited, and on the contrary, when it is too large, mechanical properties of cured product may decrease.

In the present invention, a coupling treatment may be carried out by attaching a coupling agent to the substance to be treated and heat treating directly, or the coupling agent and the substance to be treated are added to the thermosetting resin beforehand, and the coupling treatment may also be carried out by a heat treatment at curing the prepreg.

As the oxidation treatment, it is not especially limited as far as the surface of the substance to be treated can be oxidized, but it is possible to employ a chemical liquid oxidation treatment and an electrolytic oxidation treatment. Among them, a chemical liquid oxidation treatment is preferably used.

The chemical liquid oxidation treatment is a method of oxidation treatment in an acidic aqueous solution. As the acidic aqueous solution, for example, an aqueous solution containing sulfuric acid, fuming sulfuric acid, nitric acid, fuming nitric acid, hydrochloric acid, phosphoric acid, carbonic acid, boric acid, oxalic acid, fluoric acid, formic acid, butyric acid, acetic acid, boric acid-sulfuric acid, chlorosulfuric acid, chloroacetic acid, sulfosalicylic acid, sulfoacetate, maleic acid, chromic anhydride, hypochlorous acid, acrylic acid, sulfonic acid, fluorosulfonic acid, trifluoromethane sulfuric acid, trifluoromethane sulfonic acid, ammonium sulfate, ammonium formate, ammonium dihydrogen phosphate, ammonium oxalate, ammonium hydrogen sulfate, etc., may be used alone or in combination. By subjecting to the oxidation treatment, a functional group such as hydroxyl group or carboxyl group is chemically generated on the substance to be treated, and a strong adhesion is realized by letting the functional group make a chemical bond and/or hydrogen bond with the matrix resin. Among them, sulfuric acid, nitric acid or mixed acid thereof which shows strong acidity are preferably used.

As to a concentration of the acidic aqueous solution, it is preferably 0.01 wt % or more, more preferably 10 wt % or more and still more preferably 50 wt % or more. As the concentration becomes higher, the treatment time becomes shorter or there is more effect of loosening an aggregation of the substance to be treated. When an oxidant such as ozone, hydrogen peroxide, lead dioxide is added to the acidic aqueous solution, it is preferable since the oxidizing power increases.

As the surface treatment by ozone, in general, a method in which the substance to be treated is heat treated by introducing ozone into a chamber having a heater is preferably used. In this case, surface of the above-mentioned particle or fiber is modified to an activated surface, and surface wettability with the matrix resin is greatly improved, to enable to realize a strong adhesion. Furthermore, a method in which the substance to be treated is subjected to a photo oxidation treatment by an ultraviolet light irradiation under an ozone atmosphere is preferably employed.

As the surface treatment by plasma, a method of subjecting to a plasma treatment under reduced pressure by introducing a reactive gas into a chamber is preferably employed. As the reactive gas, helium, neon, argon, nitrogen, ammonia, oxygen, nitrous oxide, nitrogen monooxide, nitrogen dioxide, carbon monooxide, carbon dioxide, cyanogen bromide, hydrogen cyanide, hydrogen, steam, air, sulfur dioxide gas, hydrogen sulfide, etc., may be used alone or in combination. By carrying out a plasma treatment to the substance to be treated, it is modified to an activated surface, and surface wettability with the matrix resin is greatly improved, to enable to realize a strong adhesion.

As discharge frequencies (alternating current) of the plasma, a high frequency wave, a low frequency wave or a microwave can be used, and a direct current can also be used. As treating apparatuses, there are an internal electrode system in which an electrode is installed inside a vacuum apparatus and an external electrode system in which an electrode is installed outside the vacuum apparatus, but in the present invention, both systems can be used. As to the electrode shape, a platy, rod-like, cylindrical can be used in combination depending on its purpose, but when, as a discharge electrode, a metal rod of its surface is coated with a glass, and as an earth electrode, a metal, for example, stainless steel plate or drum are used in an interval between electrodes of, preferably 0.5 to 30 cm, more preferably 2 to 10 cm, it is preferable since there is no discharge unevenness, to enable a uniform treatment. It is preferable that the electrode is cooled with water or the like, if necessary.

As the surface treatments by the corona treatment, for example, methods disclosed in JP-S48-5043B, JP-S47-51905B, JP-S47-28067A, JP-S49-83767A, JP-S51-41770A, JP-S51-131576A, etc., can be employed. By carrying out the corona treatment to the substance to be treated, it is modified into an activated surface, and surface wettability with the matrix resin is greatly improved, to enable to realize a strong adhesion.

As surface treatments by the blast treatment, there are a wet method and a dry method, and they are carried out by blasting a fine particle projectile material contained in water or compressed air flow to surface of the conductive particle or fiber [D] and the conductive particle or fiber of which thermoplastic resin nucleus or core is coated with a conductive substance [E] and they are treating methods preferably employed to the conductive fibers [D] and [E]. By this way, the surface area is enlarged by forming fine unevenness on its surface, and it is possible to increase adhesion power between the matrix resin and the substance to be treated. As kinds of the projectile material, for example, glass beads, silicic anhydride, alumina, diamond, red iron oxide, etc., are mentioned. And, as a particle diameter of the projectile material, approximately 100 to 5000 μm is used in many cases. Generally saying, by selecting kind of the projectile material, particle diameter and ejecting pressure of the projectile material according to its purpose, it is possible to carry out the surface treatment into the most appropriate surface roughness.

The prepreg of the present invention can be produced by applying publicly known methods such as disclosed in JP-H01-26651A, JP-S63-170427A or JP-S63-170428A.

In concrete, the following 3 methods can be exemplified.

First method is a method in which, by putting and pressing a resin film, of the thermosetting resin [B] coated on a release paper or the like, to both sides or one side of the carbon fiber [A] paralleled in sheet like, to impregnate with the thermosetting resin [B], to prepare a primary impregnate prepreg, and a separate resin film containing at least one of the following (1) and (2) in the thermosetting resin [B] is sticked on its both sides or one side.

(1) the thermoplastic resin particle or fiber [C] and the conductive particle or fiber [D]

(2) the conductive particle or fiber of which thermoplastic resin nucleus or core is coated with a conductive substance [E]

Here, instead of putting the separate resin film containing at least any one of the items (1) and (2) in the thermosetting resin [B], it is also possible to scatter or put at least any one of the items (1) and (2) only on the above-mentioned primary impregnate prepreg.

Second method is a method in which, to the primary impregnate prepreg prepared by the first method, a separate resin film of the thermosetting resin [B] coated on a release paper or the like of which surface at least any one of the above-mentioned (1), (2) is scattered or sticked, is sticked to both sides or one side of the above-mentioned primary impregnate prepreg.

Third method is a method in which a resin film, in which the thermosetting resin [B] containing at least any one of the above-mentioned (1), (2) is coated on a release paper or the like, is put and pressed to both sides or one side of the carbon fiber [A] paralleled in sheet like, to impregnate with the thermosetting resin [B] containing at least any one of the above-mentioned (1), (2), to prepare a prepreg. The carbon fiber reinforced composite material of the present invention can be produced by laying-up the above-mentioned prepreg of the present invention, and by heat•pressing to cure the heat curable resin [B]. Here, as a method for imparting heat•pressing, a press forming, an autoclave molding, a bag molding method, a wrapping tape method and an internal pressure molding method, etc., are employed, and especially the autoclave molding is preferably employed.

The carbon fiber reinforced composite material of the present invention is, since it is excellent in strength, stiffness, impact resistance and conductivity, etc., widely used in aerospace application and in general industrial application, etc. In more concrete, in the aerospace application, it is preferably used for an aircraft primary structural member application such as main wing, tail wing and floor beam, for an aircraft secondary structural member application such as flap, aileron, cowl, fairing and interior material, and for rocket motor case and artificial satellite structural material application, etc. Among such aerospace applications, especially aircraft primary structural material applications in which impact resistance and lightning protection are necessary, especially for fuselage skin, main wing skin and tail wing skin, the carbon fiber reinforced composite material by the present invention is especially preferably used. And, in general industrial applications, it is preferably used for structural material of mobiles such as cars, ships and railway vehicles, and for a driveshaft, a leaf spring, a windmill blade, a pressure vessel, a flywheel, a roller for paper making, a roofing material, a cable, a reinforcing bar, an application for computer such as an IC tray or kyotai (housing) of notebook computer and for a civil engineering/building application such as a repairing/reinforcing material, etc. Among them, for an automotive outer panel, an outer panel of ship, an outer panel of railway vehicle, a windmill blade and an IC tray or kyotai (housing) of notebook computer, the carbon fiber reinforced composite material by the present invention is especially preferably used.

EXAMPLES

Hereafter, the present invention is explained in more detail with reference to the examples. In order to obtain the prepreg of each example, the following materials were used.

<Carbon Fiber>

"Torayca (trademark)" T800S-24K-10E (carbon fiber, number of fiber 24,000 fibers, tensile strength 5.9 GPa, tensile modulus 290 GPa, tensile strain 2.0%, produced by Toray Industries, Inc.)

"Torayca (trademark)" T700S-24K-50C (carbon fiber, number of fiber 24,000 fibers, tensile strength 4.9 GPa, tensile modulus 230 GPa, tensile strain 2.1%, produced by Toray Industries, Inc.)

<Thermosetting Resin>

Bisphenol A type epoxy resin, "Epikote (trademark)" 825 (produced by Japan Epoxy Resins Co., Ltd.)

Tetraglycidyldiaminodiphenylmethane, ELM434(produced by Sumitomo Chemical Co., Ltd.)

Polyethersulfone having hydroxyl group on its ends "Sumikaexcel (trademark)" PES5003P (produced by Sumitomo Chemical Co., Ltd.)

4,4'-Diaminodiphenyl sulfone (produced by Mitsui Fine Chemical Inc.)

<Thermoplastic Resin Particle>

Nylon12 particle SP-10 (produced by Toray Industries, Inc., shape: true sphere)

Epoxy modified nylon particle A obtained by the following production method

A transparent polyamide ("Grilamid (trademark)"-TR55, produced by EMSER WERKE AG) 90 parts by weight, epoxy resin (product name "Epikote (trademark)" 828, produced by Yuka-Shell Epoxy Co., Ltd.) 7.5 parts by weight and a hardener (product name "Tohmide (trademark)" #296, produced by Fuji Kasei Kogyo Co., Ltd.) 2.5 parts by weight were added to a mixed solvent of chloroform 300 parts by weight and methanol 100 parts by weight, to obtain a uniform solution. Next, the obtained uniform solution was misted by a spray gun for painting, well stirred and sprayed to liquid surface of n-hexane of 3000 parts by weight, to precipitate the solute. The precipitated solid was filtered, and after fully washed by n-hexane, vacuum dried at a temperature of 100° C. for 24 hours, to obtain a true spherical epoxy modified nylon particle A.

After the epoxy modified nylon particle A was press-molded into a resin plate, in accordance with ASTM D 5045-96, when $G_{1c}$ value was determined by compact tension method, it was found to be 4420 J/m$^2$.

<Thermoplastic Resin Fiber>

TR-55 short fiber obtained by the following production method

A transparent polyamide (product name "Grilamid (trademark)"-TR55, produced by EMSER WERKE AG) fiber extruded from a spinneret equipped with one orifice was cut and a TR-55 short fiber (fiber length 1 mm) of which cross-sectional shape is perfect circle was obtained.

After the TR-55 was press-molded into a resin plate, when $G_{1c}$ value by compact tension method was determined in accordance with ASTM D 5045-96, it was found to be 4540 J/m$^2$.

<Conductive Particle>

"Micropearl (trademark)" AU215 (produced by Sekisui Chemical Co., Ltd., shape: true sphere, specific gravity: 1.8 g/cm$^3$, thickness of conductive layer: 110 nm, [volume of nucleus]/[volume of conductive layer]: 22.8) which is a particle in which a divinylbenzene polymer particle is plated by nickel and further plated by gold thereon "Micropearl (trademark)" AU225 (produced by Sekisui Chemical Co., Ltd., shape: true sphere, specific gravity: 2.4 g/cm$^3$, thickness of conductive layer: 200 nm, [volume of nucleus]/[volume of conductive layer]: 20.2) which is a particle in which a divinylbenzene polymer particle is plated by nickel and further plated by gold thereon Glassy carbon particle "Bellpearl (trademark)" C-2000 (produced by Air Water Inc., shape: true sphere, specific gravity: 1.5 g/cm$^3$)

Conductive particle B (shape: true sphere, specific gravity: 1.3 g/cm$^3$) obtained by the following production method Ferrous acetate (produced by Sigma-Aldrich Co.) 0.01 g and cobalt acetate tetrahydrate (produced by Nacalai Tesque, Inc.) 0.21 g were added to ethanol (produced by Nacalai Tesque, Inc.) 40 ml, and suspended for 10 minutes by an ultrasonic washer. To this suspension, crystalline titanosilicate powder (produced by N.E. Chemcat Corp. "Titanosilicate (trademark)") (TS-1) 2.0 g was added, and treated by the ultrasonic washer for 10 minutes, and by removing the methanol under a constant temperature of 60° C., a solid catalyst in which the above-mentioned metal acetate is supported by TS-1 crystal surface was obtained.

The solid catalyst 1.0 g prepared in the above-mentioned was put on a quartz boat in center portion of a quartz tube of inner diameter 32 mm, and argon gas fed at 600 cc/min. The quartz tube was placed in an electric furnace and its center temperature was heated to a temperature of 800° C. (heating time 30 minutes). When the temperature arrived at 800° C., after a high purity acetylene gas (produced by Koatsu Gas Kogyo Co., Ltd.) was fed at 5 cc/min for 30 minutes, the feed of acetylene gas was stopped and the temperature was cooled down to room temperature, and a composition containing a hollow carbon nanofiber was taken out. The composition containing the obtained hollow carbon nanofiber 0.4 g was put in an electric furnace and heated to 400° C. (heating time 40 minutes) under an atmospheric environment. After keeping at a temperature of 400° C. for 60 minutes, it was cooled down to room temperature. Furthermore, after this composition containing the hollow carbon nanofiber was thrown into 2.5 mol/L aqueous solution of sodium hydroxide 200 ml, the solution was stirred for 5 hours while keeping at a temperature of 80° C. After that, it was suction-filtered by a membrane filter of 10 μm diameter, to carry out a solid/liquid separation. After washing the obtained solid by distilled water 1 L, it was thrown into 5.1 mol/L concentration sulfuric acid 50 ml, and stirred for 2 hours while keeping at a temperature of 80° C. After that, the solid substance was separated by using a filter paper (produced by Toyo Roshi Kaisha, Ltd.), Filter Paper No. 2 of 125 mm. After the solid substance on the filter paper was washed by distilled water 500 ml, it was dried at a temperature of 60° C., to obtain a hollow carbon nanofiber at a recovery yield of 90%.

In ethanol 100 ml, the hollow carbon fiber obtained in the above-mentioned 5 g and the epoxy modified nylon particle A obtained in the item of the above-mentioned thermoplastic resin particle 23 g were added, and stirred for 1 hour to obtain a suspended liquid. The obtained suspended liquid was concentrated under reduced pressure. Subsequently, by curing by heating to a temperature of 200° C. under argon atmosphere, a conductive particle B 25 g was obtained. When a cross-section of this conductive particle B was observed by a scanning electron microscope, it was fount that a conductive layer was formed in a thickness of 300 nm. [Volume of nucleus]/[volume of conductive layer] was 7.0.

Conductive particle C obtained by the following production method

By using sputtering apparatus CFS-4ES-231(produced by Shibaura Mechatronics Corp.), the epoxy modified nylon particle A 10 g was put on a base plate and a sputtering was carried out in a condition in which target was copper, gas component was argon, gas pressure was $2.0 \times 10^{-1}$ Pa, base plate temperature was 80° C. and electric power was 500 W, to prepare a conductive particle C of which thickness of conductive layer was 110 nm. It was found that the shape of conductive particle was true sphere, the specific gravity was 1.4 g/cm$^3$ and the [volume of nucleus]/[volume of conductive layer] was 18.6.

Conductive particle D obtained by the following production method

By using sputtering apparatus CFS-4ES-231(produced by Shibaura Mechatronics Corp.), the epoxy modified nylon particle A 10 g was put on a base plate and a sputtering was carried out in a condition in which target was titanium, gas component was argon, gas pressure was $3.0 \times 10^{-1}$ Pa, base plate temperature was 80° C. and electric power was 500 W, to prepare a conductive particle D of which thickness of conductive layer was 130 nm. It was found that the shape of conductive particle was true sphere, the specific gravity was 1.3 g/cm$^3$ and the [volume of nucleus]/[volume of conductive layer] was 15.7.

Conductive particle E obtained by the following production method

The epoxy modified nylon particle A 100 g was added to 1000 ml of electroless copper plating liquid MK-430 (produced by Muromachi Chemical Inc.), and subsequently a plating treatment was carried out at 50° C. for 45 minutes, to prepare a conductive particle E. It was found that the shape of conductive particle E was true sphere, the specific gravity was 1.4 g/cm$^3$, the thickness of conductive layer was 120 nm, and the [volume of nucleus]/[volume of conductive layer] was 17.0.

Conductive particle F obtained by the following production method

The epoxy modified nylon particle A 100 g was added to 1000 ml of electroless nickel plating liquid NLT-PLA (produced by Nikko Metal Plating Co., Ltd.), and subsequently a plating treatment was carried out at 50° C. for 60 minutes, to prepare a conductive particle F. It was found that the shape of conductive plate F was true sphere, the specific gravity was 1.4 g/cm³, the thickness of conductive layer was 180 nm, and the [volume of nucleus]/[volume of conductive layer] was 11.2.

Conductive particle G obtained by the following production method

Transparent polyamide (product name "Grilamid (trademark)"-TR55, produced by EMSER WERKE AG) 60 parts by weight, epoxy resin (product name "Epikote (trademark)" 828, produced by Japan Epoxy Resins Co.,Ltd.) 30 parts by weight and a hardener (product name "Tohmide (trademark)" #296, produced by Fuji Kasei Kogyo Co., Ltd.) 10 parts by weight were added to a mixed solvent of chloroform 300 parts by weight and methanol 100 parts by weight, to obtain a uniform solution. Next, the obtained uniform solution was misted by a spray gun for painting, well stirred and sprayed to liquid surface of n-hexane of 3000 parts by weight, to precipitate the solute. The precipitated solid was separated by filtration, and after fully washed by n-hexane, vacuum dried at a temperature of 100° C. for 24 hours, to obtain a true spherical epoxy modified nylon particle H.

The epoxy modified nylon particle H 100 g was added to 1000 ml electroless copper plating liquid MK-430 (produced by Muromachi Chemical Inc.), subsequently a plating treatment was carried out at 50° C. for 45 minutes, to prepare conductive particle G. It was found that the shape of conductive plate G was true sphere, the specific gravity was 2.2 g/cm³, the thickness of conductive layer was 320 nm, and the [volume of nucleus]/[volume of conductive layer] was 6.2.

After the epoxy modified nylon particle H was press-molded into a resin plate, when $G_{1c}$ value by compact tension method was determined in accordance with ASTM D 5045-96, it was found to be 1210 J/m².

Surface treated article I of "Micropearl (trademark)" AU215 obtained by the following production method 3-(phenylamino) propyltrimethoxysilane 2 parts by weight was sprayed, while being stirred by a mixer, to "Micropearl (trademark)" AU215 100 parts by weight, subsequently heat treated at 100° C. for 12 hours, to obtain a surface treated article I of "Micropearl (trademark)" AU215.

Surface treated article J of "Bellpearl(trademark)" C-2000 obtained by the following production method "Bellpearl (trademark)" C-2000 100 g was added to 98 wt % sulfuric acid solution 150 ml and 60 wt % nitric acid solution 50 ml, subsequently stirred at 120° C. for 20 minutes and after separated by a filter, fully washed with water, to obtain a surface treated article J of "Bellpearl (trademark)" C-2000.

<Conductive Fiber>

"Torayca (trademark)" milled fiber MLD-30 (produced by Toray Industries, Inc., cross-sectional shape: perfect circle, specific gravity: 1.8 g/cm³, fiber length 30 μm)

"Torayca (trademark)" chopped fiber T008-3 (produced by Toray Industries, Inc., cross-sectional shape: perfect circle, specific gravity: 1.8 g/cm³, fiber length 3 mm)

Conductive fiber A obtained by the following production method

TR-55 short fiber (fiber length 1 mm) 100 g was added to electroless copper plating liquid MK-430 (produced by Muromachi Chemical Inc.) 1000 ml, subsequently a plating treatment was carried out at 50° C. for 45 minutes, to obtain a conductive fiber A. It was found that cross-sectional shape of the conductive fiber A was perfect circle, specific gravity was 1.6 g/cm³, the thickness of conductive layer was 100 nm, the [volume of core]/[volume of conductive layer] was 13.3.

Whereas, determination of average diameter of the thermoplastic resin particle or fiber [C], the conductive particle or fiber [D] and the conductive particle or fiber of which thermoplastic resin nucleus or core is coated with a conductive substance [E], containing ratio of the particles or fibers of the above-mentioned [C], [D] and [E] present in the depth range of 20% of prepreg thickness, compressive strength after impact and conductivity of fiber reinforced composite material were carried out in the following conditions. Except where it is explicitly stated otherwise, the determinations were carried out in an environment of a temperature of 23° C. and a relative humidity of 50%.

(1) Determinations of Average Diameters of Particles [C], [D] and [E] and Volume Ratio Expressed by [Volume of Nucleus]/[Volume of Conductive Layer] of Conductive Particle Coated with Conductive Substance As to the average diameter of the particle, for example, it was determined as the average value (n=50) of particle diameters by photographing particles at a magnification of 1000 times or more by a microscope such as scanning electron microscope, selecting a particle arbitrarily, and taking diameter of circumscribed circle of the particle as the particle diameter. And, when a volume ratio expressed by [volume of nucleus]/[volume of conductive layer] of conductive particle coated with a conductive substance is determined, at first, an average particle diameter of nucleus of the conductive particle (average particle diameter) is measured by the above-mentioned method, and after that, a cross-section of the conductive particle coated with a conductive substance is photographed by a scanning type microscope at a magnification of 10,000 times, the thickness of conductive layer was measured (n=10), and its average value was calculated. Such a determination was carried out for the above-mentioned arbitrarily selected conductive particles (n=50). The average particle diameter of nucleus of the conductive particle and 2 times of the average value of thickness of the conductive layer were added together and taken as the average diameter of conductive particle (average particle diameter). And, based on the average diameter of nucleus of the conductive particle (average particle diameter) and the average diameter of conductive particle (average particle diameter), a volume ratio expressed by [volume of nucleus]/[volume of conductive layer] was calculated. Whereas, in case where a particle was nonspherical, supposing circumscribed sphere of the nucleus, a calculated value calculated by supposing a sphere coated on the circumscribed sphere with the conductive layer measured by the above-mentioned method was taken as a volume ratio.

Determination results of average particle diameter of each particle of the thermoplastic resin particle and the conductive particle were as follows.

<Thermoplastic resin particle>

Nylon 12 particle SP-10 (produced by Toray Industries, Inc.) . . . 10.2 μm

Epoxy modified nylon particle A . . . 12.5 μm

<Conductive Particle>

"Micropearl" AU215 . . . 15.5 μm

"Micropearl" AU225 . . . 25.0 μm

"Bellpearl" C-2000 . . . 15.3 μm

Conductive particle B . . . 13.8 μm

Conductive particle C . . . 12.7 μm

Conductive particle D . . . 12.9 μm

Conductive particle E . . . 12.7 μm

Conductive particle F . . . 13.0 μm

Conductive particle G . . . 13.1 μm

Surface treated article I of "Micropearl" AU215 . . . 15.5 μm

Surface treated article J of "Bellpearl" C-2000 . . . 15.3 μm (2) Determination of Average Fiber Diameter the Fiber of [C], [D] and [E] and the Volume Ratio Expressed by [Volume of Core]/[Volume of Conductive Layer] of the Conductive Fiber Coated with the Conductive Substance As to the average diameter of the fiber (average fiber diameter), for example, it was determined as the average value (n=50) of fiber diameters by photographing fibers at a magnification of 1000 times or more by a microscope such as scanning electron microscope, selecting a fiber cross-section arbitrarily, and taking diameter of circumscribed circle of the fiber as the fiber diameter. And, when a volume ratio expressed by the [volume of nucleus]/[volume of conductive layer] of conductive fiber coated with a conductive substance is determined, at first, an average fiber diameter of nucleus of the conductive fiber (average fiber diameter) is measured by the above-mentioned method. And after that, a cross-section of the conductive fiber coated with a conductive substance is photographed by a scanning type microscope at a magnification of 10,000 times, the thickness of conductive layer was measured (n=10), and its average value was calculated. Such a determination was carried out for the above-mentioned arbitrarily selected conductive fibers (n=50). The average fiber diameter of nucleus of the conductive fiber and 2 times of the average value of thickness of the conductive layer were added together and taken as the average diameter of conductive fiber (average fiber diameter). And, by using the average diameter of nucleus of the conductive fiber and the average diameter of conductive fiber, a volume ratio expressed by the [volume of nucleus]/[volume of conductive layer] was calculated. Whereas, determination result of average fiber diameter of each fiber of the thermoplastic resin fiber and of the conductive fiber was as follows.

<Thermoplastic Resin Fiber>
  TR-55 short fiber . . . 5.4 μm
<Conductive Fiber>
  "Torayca" milled fiber MLD-30 . . . 7.2 μm
  "Torayca" chopped fiber T008 . . . 6.9 μm
  Conductive fiber A . . . 5.6 μm (3) Containing Ratio of the Particle or Fiber of [C], [D] and [E] Present in Depth Range of 20% of Prepreg Thickness A prepreg was held and closely contacted between 2 smooth surface polytetrafluoroethylene resin plates, and gelled and cured by gradually raising temperature up to 150° C. in 7 days to prepare a platy cured prepreg product. After the curing, it was cut in a direction perpendicular to the closely contacted surface, and after the cross-section was polished, it was magnified 200 times or more by an optical microscope and photographed such that the upper and lower surfaces of the prepreg were into view. By the same procedure, distance between the polytetrafluoroethylene resin plate were measured at 5 positions in horizontal direction of the cross-section photograph and their average value (n=10) was taken as the thickness of prepreg.

On both sides of the photograph of this cured product of the prepreg, 2 lines which are parallel to the surface of the prepreg are drawn at positions of 20% depth from the surface of the cured product of prepreg. Next, a total area of the above-mentioned particle or fiber present between the prepreg surface and the above-mentioned line, and a total area of the particle or fiber present throughout the thickness of the prepreg are determined, and calculate the containing ratio of the particle or fiber present in 20% depth range from the prepreg surface, with respect to the prepreg thickness 100%.

Here, the total area of the above-mentioned particle or fiber is determined by clipping the particle or fiber portion from the cross-section photograph and weighing its weight. In case where a distinction of particles dispersed in the resin after taking a photograph was difficult, the particle was photographed after dyeing, appropriately.

(4) Determination of Volume Resistivity of Conductive Particle or Fiber

By using MCP-PD51 type powder resistance measurement system produced by Dia Instruments Co., Ltd., a sample was set to a cylindrical cell having a 4 probe electrode, and its thickness and resistivity values were measured in condition where a pressure of 60 MPa was added to the sample, and from those values, volume resistivity was calculated.

Whereas, volume resistivity of the conductive particles or fibers were as follows.

<Conductive Particle>
  "Micropearl" AU215 . . . $1.4 \times 10^{-3}$ Ωcm
  "Micropearl" AU225 . . . $1.6 \times 10^{-3}$ Ωcm
  "Bellpearl" C-2000 . . . $2.0 \times 10^{-2}$ Ωcm
  Conductive particle B . . . $5.0 \times 10^{-2}$ Ωcm
  Conductive particle C . . . $3.5 \times 10^{-2}$ Ωcm
  Conductive particle D . . . $5.2 \times 10^{-2}$ Ωcm
  Conductive particle E . . . $4.5 \times 10^{-4}$ Ωcm
  Conductive particle F . . . $4.0 \times 10^{-2}$ Ωcm
  Conductive particle G . . . $6.1 \times 10^{-4}$ Ωcm
  "Micropearl" AU215 surface treated article I . . . $1.4 \times 10^{-3}$ Ωcm
  "Bellpearl" C-2000 surface treated article J . . . $2.0 \times 10^{-2}$ Ωcm <Conductive Fiber>
  "Torayca" milled fiber MLD-30 . . . $6.6 \times 10^{-2}$ Ωcm
  "Torayca" chopped fiber T008-3 . . . $9.3 \times 10^{-2}$ Ωcm
  Conductive fiber A . . . $7.1 \times 10^{-3}$ Ωcm (5) Determination of Compressive Strength After Impact of Fiber Reinforced Composite Material 24 plies of unidirectional prepreg were laid-up quasi-isotropically in $[+45°/0°/-45°/90°]_{3s}$ constitution, and molded in an autoclave at a temperature of 180° C. for 2 hours under a pressure of 0.59 MPa and at a heating speed of 1.5° C./min priot to the 2 hour cure, to prepare 25 pieces of laminate. From each of these laminates, a sample of length 150 mm×width 100 mm was cut out and, in accordance with SACMA SRM 2R-94, compressive strength after impact was determined by adding a drop impact of 6.7 J/mm on its center portion.

(6) Determination of Conductivity of Fiber Reinforced Composite Material 24 plies of unidirectional prepreg were laid-up quasi-isotropically in $[+45°/0°/-45°/90°]_{3s}$ constitution, and molded in an autoclave at a temperature of 180° C. for 2 hours under a pressure of 0.59 MPa and at a heating speed of 1.5° C./min priot to the 2 hour cure, to prepare 25 pieces of laminate. From each of these laminates, a sample of length 50 mm×width 50 mm was cut out and coated on both sides with a conductive paste "Dote" (trademark) D-550 (produced by Fujikura Kasei Co., Ltd.), to prepare a sample. For these samples, by using R6581 digital multimeter produced by Advantest Corp., resistivity in laminate direction was measured by four probe method to obtain a volume resistivity.

Example 1

By a kneader, 10 parts by weight of PES5003P was compounded and dissolved in 50 parts by weight of "Epikote (trademark)" 825 and 50 parts by weight of ELM434, and then 19.98 parts by weight of epoxy modified nylon particle A and 0.02 parts by weight of "Micropearl (trademark)" AU215 were kneaded, and furthermore, 40 parts by weight of 4,4'-diaminodiphenyl sulfone which is a hardener was kneaded, to prepare a thermosetting resin composition.

The prepared thermosetting resin composition was coated on a release paper by using a knife coater, to prepare 2 sheets of resin film of 52 g/m². Next, on carbon fiber (T800S-24K-10E) arranged into a unidirectional sheet, 2 sheets of the resin film prepared in the above-mentioned were superposed on both sides of the carbon fiber, and impregnated with the resin by heat and pressure, to prepare a unidirectional prepreg of which carbon fiber areal weight was 190 g/m² and weight ratio of matrix resin was 35.4%.

By using the prepared unidirectional prepreg, containing ratio of particle present in 20% depth range of prepreg thickness, compressive strength after impact and conductivity of the fiber reinforced composite material were determined. The obtained results are shown in Table 1.

Examples 2 to 24 and Comparative examples 1 to 7

Prepreg were prepared in the same way as Example 1 except changing the kinds of carbon fiber, thermoplastic resin particle or conductive particle or the compounding amounts as shown in Tables 1 to 4. By using the prepared unidirectional prepreg, containing ratio of particle present in 20% depth range of prepreg thickness, compressive strength after impact and conductivity of the fiber reinforced composite material were determined.

Example 25

By a kneader, after 10 parts by weight of PES5003P was compounded and dissolved in 50 parts by weight of "Epikote (trademark)" 825 and 50 parts by weight of ELM434, and furthermore, 40 parts by weight of 4,4'-diaminodiphenyl sulfone which is a hardener was kneaded, to prepare a thermosetting resin composition. This matrix resin was taken as primary resin.

By a kneader, 10 parts by weight of PES5003P was compounded and dissolved in 50 parts by weight of "Epikote (trademark)" 825 and 50 parts by weight of ELM434, and then, 62.5 parts by weight of epoxy modified nylon particle A and 1.3 parts by weight of "Micropearl (trademark)" AU215 were kneaded, and furthermore, 40 parts by weight of 4,4'-diaminodiphenyl sulfone which is a hardener was kneaded, to prepare a thermosetting resin composition. This matrix resin was taken as secondary resin.

The prepared primary resin was coated on a release paper by using a knife coater, to prepare 2 sheets of resin film of 31.5 g/m². Next, on carbon fiber (T800S-24K-10E) arranged into a unidirectional sheet, 2 sheets of the resin film prepared in the above-mentioned were superposed on both sides of the carbon fiber, and impregnated with the resin by heat and pressure, to prepare a unidirectional prepreg of which carbon fiber areal weight was 190 g/m² and weight ratio of matrix resin was 24.9%.

Next, the prepared secondary resin was coated on a release paper by using a knife coater, to prepare 2 sheets of resin film of 20.5 g/m². Next, between these secondary resin films facing each other, the above prepared primary impregnate prepreg was inserted, and impregnated with the resin by heat and pressure in the same way as the primary impregnate prepreg, to prepare a secondary impregnate prepreg. This prepreg of which carbon fiber areal weight was 190 g/m² and weight ratio of matrix resin was 35.4% was prepared as a secondary impregnate prepreg. Matrix resin composition of this secondary impregnate prepreg is shown in Table 4.

By using the prepared secondary impregnate prepreg, containing ratio of particle present in 20% depth range of prepreg thickness, compressive strength after impact and conductivity of the fiber reinforced composite material were determined. The obtained results are shown in Table 4.

Example 26

By a kneader, 10 parts by weight of PES5003P was compounded and dissolved in 50 parts by weight of "Epikote (trademark)" 825 and 50 parts by weight of ELM434, and then 40 parts by weight of 4,4'-diaminodiphenyl sulfone which is a hardener was kneaded, to prepare a thermosetting resin composition.

The prepared thermosetting resin composition was coated on a release paper by using a knife coater, to prepare 2 sheets of resin film of 45 g/m². Next, on carbon fiber (T800S-24K-10E) arranged into a unidirectional sheet, 2 sheets of the resin film prepared in the above-mentioned were superposed on both sides of the carbon fiber, and impregnated with the resin by heat and pressure. Furthermore, on both sides thereof, TR-55 short fiber which is a thermoplastic resin fiber and "Torayca" milled fiber MLD-30 which is a conductive fiber were scattered. The scattered amounts were 6.5 g/m² and 0.5 g/m², respectively. In this way, a unidirectional prepreg of which carbon fiber areal weight was 190 g/m² and weight ratio of matrix resin was 35.4% was prepared.

By using the prepared unidirectional prepreg, containing ratio of particle present in 20% depth range of prepreg thickness, compressive strength after impact and conductivity of the fiber reinforced composite material were determined.

The obtained results are shown in Table 5.

Examples 27 to 29

Prepregs were prepared in the same way as Example 25 except changing the kinds of conductive particle or fiber as shown in Tables 5 and changing the scattered amount of the thermoplastic resin particle or fiber to 6.5 g/m², and the scattered amount of the conductive particle or fiber to 0.5 g/m². By using the prepared unidirectional prepreg, containing ratio of particle present in 20% depth range of prepreg thickness, compressive strength after impact and conductivity of the fiber reinforced composite material were determined.

Example 30, Comparative examples 8 and 9

Prepregs were prepared in the same way as Example 25 except changing the kinds of thermoplastic resin fiber or conductive fiber as shown in Tables 5 and changing the scattered amount of those to 7.0 g/m². By using the prepared unidirectional prepreg, containing ratio of the above-mentioned particle or fiber in 20% depth range of prepreg thickness, compressive strength after impact and conductivity of the fiber reinforced composite material were determined.

The obtained results are summarized in Tables 1 to 5.

TABLE 1

| | | Example | | | | | |
|---|---|---|---|---|---|---|---|
| | | 1 | 2 | 3 | 4 | 5 | 6 |
| Thermosetting resin Composition | Carbon fiber | T800S | T800S | T800S | T800S | T800S | T800S |
| | Thermosetting resin | | | | | | |
| | Epikote 825 | 50 | 50 | 50 | 50 | 50 | 50 |
| | ELM434 | 50 | 50 | 50 | 50 | 50 | 50 |
| | 4,4'-diaminodiphenyl sulfone | 40 | 40 | 40 | 40 | 40 | 40 |
| | PES5003P | 10 | 10 | 10 | 10 | 10 | 10 |
| | Thermoplastic resin particle | | | | | | |
| | SP-10 | 0 | 0 | 0 | 0 | 0 | 0 |
| | Epoxy modified nylon particle A | 19.98 | 19.8 | 19.6 | 18 | 15 | 10 |
| | Conductive particle | | | | | | |
| | "Micropearl" AU215 | 0.02 | 0.2 | 0.4 | 2 | 5 | 10 |
| | "Micropearl" AU225 | 0 | 0 | 0 | 0 | 0 | 0 |
| | "Bellpearl" C-2000 | 0 | 0 | 0 | 0 | 0 | 0 |
| | Conductive particle B | 0 | 0 | 0 | 0 | 0 | 0 |
| | Conductive particle C | 0 | 0 | 0 | 0 | 0 | 0 |
| | Conductive particle D | 0 | 0 | 0 | 0 | 0 | 0 |
| | Conductive particle E | 0 | 0 | 0 | 0 | 0 | 0 |
| | Conductive particle F | 0 | 0 | 0 | 0 | 0 | 0 |
| | Conductive particle G | 0 | 0 | 0 | 0 | 0 | 0 |
| | Surface treated article I of "Micropearl" AU215 | 0 | 0 | 0 | 0 | 0 | 0 |
| | Surface treated article J of "Bellpearl" C-2000 | 0 | 0 | 0 | 0 | 0 | 0 |
| | Compounding amount of [C] (pts by wt)/ compounding amount of [D] (pts by wt) | 999.0 | 99.0 | 49.0 | 9.0 | 3.0 | 1.0 |
| Characteristics of prepreg | Containing ratio of particle present in 20% depth range | 97 | 98 | 97 | 96 | 97 | 100 |
| Characteristics of composite material | Compressive strength after impact (MPa) | 290 | 288 | 289 | 287 | 280 | 265 |
| | Volume resistivity (Ωcm) | $1.1 \times 10^5$ | $1.5 \times 10^4$ | $5.0 \times 10^3$ | $4.2 \times 10^3$ | $4.0 \times 10^3$ | $4.2 \times 10^3$ |

TABLE 2

| | | Example | Comparative example | | | |
|---|---|---|---|---|---|---|
| | | 7 | 1 | 2 | 3 | 4 |
| Thermosetting resin composition | Carbon fiber | T700S | T800S | T800S | T800S | T800S |
| | Thermosetting resin | | | | | |
| | Epikote 825 | 50 | 50 | 50 | 50 | 50 |
| | ELM434 | 50 | 50 | 50 | 50 | 50 |
| | 4,4'-diaminodiphenyl sulfone | 40 | 40 | 40 | 40 | 40 |
| | PES5003P | 10 | 10 | 10 | 10 | 10 |
| | Thermoplastic resin particle | | | | | |
| | SP-10 | 0 | 0 | 0 | 0 | 0 |
| | Epoxy modified nylon particle A | 19.6 | 20 | 0 | 19.99 | 8 |
| | Conductive particle | | | | | |
| | "Micropearl" AU215 | 0.4 | 0 | 20 | 0.01 | 12 |
| | "Micropearl" AU225 | 0 | 0 | 0 | 0 | 0 |
| | "Bellpearl" C-2000 | 0 | 0 | 0 | 0 | 0 |
| | Conductive particle B | 0 | 0 | 0 | 0 | 0 |
| | Conductive particle C | 0 | 0 | 0 | 0 | 0 |
| | Conductive particle D | 0 | 0 | 0 | 0 | 0 |
| | Conductive particle E | 0 | 0 | 0 | 0 | 0 |
| | Conductive particle F | 0 | 0 | 0 | 0 | 0 |
| | Conductive particle G | 0 | 0 | 0 | 0 | 0 |
| | Surface treated article I of "Micropearl" AU215 | 0 | 0 | 0 | 0 | 0 |
| | Surface treated article J of "Bellpearl" C-2000 | 0 | 0 | 0 | 0 | 0 |
| | Compounding amount of [C] (pts by wt)/ compounding amount of [D] (pts by wt) | 9.0 | — | — | 1999.0 | 0.7 |
| Characteristics of prepreg | Containing ratio of particle present in 20% depth range | 97 | 97 | 97 | 97 | 96 |
| Characteristics of composite material | Compressive strength after impact (MPa) | 287 | 289 | 235 | 289 | 219 |
| | Volume resistivity (Ωcm) | $5.7 \times 10^3$ | $1.5 \times 10^6$ | $3.8 \times 10^3$ | $1.1 \times 10^6$ | $4.2 \times 10^3$ |

TABLE 3

| | | Example | | | | | | Comparative example | | |
|---|---|---|---|---|---|---|---|---|---|---|
| | | 8 | 9 | 10 | 11 | 12 | 13 | 5 | 6 | 7 |
| Thermosetting resin composition | Carbon fiber Thermosetting resin | T800S | T800S | T800S | T800S | T800S | T800S | T800S | T800S | T800S |
| | Epikote 825 | 50 | 50 | 50 | 50 | 50 | 50 | 50 | 50 | 50 |
| | ELM434 | 50 | 50 | 50 | 50 | 50 | 50 | 50 | 50 | 50 |
| | 4,4'-diaminodiphenyl sulfone | 40 | 40 | 40 | 40 | 40 | 40 | 40 | 40 | 40 |
| | PES5003P Thermoplastic resin particle | 10 | 10 | 10 | 10 | 10 | 10 | 10 | 10 | 10 |
| | SP-10 | 19.98 | 19.8 | 19.6 | 18 | 15 | 10 | 20 | 19.99 | 8 |
| | Epoxy modified nylon particle A Conductive particle | 0 | 0 | 0 | 0 | 0 | 0 | 0 | 0 | 0 |
| | "Micropearl" AU215 | 0.02 | 0.2 | 0.4 | 2 | 5 | 10 | 0 | 0.01 | 12 |
| | "Micropearl" AU225 | 0 | 0 | 0 | 0 | 0 | 0 | 0 | 0 | 0 |
| | "Bellpearl" C-2000 | 0 | 0 | 0 | 0 | 0 | 0 | 0 | 0 | 0 |
| | Conductive particle B | 0 | 0 | 0 | 0 | 0 | 0 | 0 | 0 | 0 |
| | Conductive particle C | 0 | 0 | 0 | 0 | 0 | 0 | 0 | 0 | 0 |
| | Conductive particle D | 0 | 0 | 0 | 0 | 0 | 0 | 0 | 0 | 0 |
| | Conductive particle E | 0 | 0 | 0 | 0 | 0 | 0 | 0 | 0 | 0 |
| | Conductive particle F | 0 | 0 | 0 | 0 | 0 | 0 | 0 | 0 | 0 |
| | Conductive particle G | 0 | 0 | 0 | 0 | 0 | 0 | 0 | 0 | 0 |
| | Surface treated article I of "Micropearl" AU215 | 0 | 0 | 0 | 0 | 0 | 0 | 0 | 0 | 0 |
| | Surface treated article J of "Bellpearl" C-2000 | 0 | 0 | 0 | 0 | 0 | 0 | 0 | 0 | 0 |
| | Compounding amount of [C] (pts by wt)/ compounding amount of [D] (pts by wt) | 999.0 | 99.0 | 49.0 | 9.0 | 3.0 | 1.0 | — | 1999.0 | 0.7 |
| Characteristics of Prepreg | Containing ratio of particle present in 20% depth range | 96 | 97 | 97 | 98 | 96 | 97 | 97 | 98 | 97 |
| Characteristics of Composite material | Compressive strength after impact (MPa) | 345 | 343 | 343 | 335 | 328 | 298 | 343 | 344 | 258 |
| | Volume resistivity (Ωcm) | $9.8 \times 10^4$ | $1.3 \times 10^4$ | $4.8 \times 10^3$ | $4.0 \times 10^3$ | $3.9 \times 10^3$ | $3.8 \times 10^3$ | $1.4 \times 10^6$ | $1.0 \times 10^6$ | $3.8 \times 10^3$ |

TABLE 4

| | | Example | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| Thermosetting resin composition | Carbon fiber Thermosetting resin | T800S | T800S | T800S | T800S | T800S | T800S | T800S | T800S | T800S | T800S | T800S | T800S |
| | Epikote 825 | 50 | 50 | 50 | 50 | 50 | 50 | 50 | 50 | 50 | 50 | 50 | 50 |
| | ELM434 | 50 | 50 | 50 | 50 | 50 | 50 | 50 | 50 | 50 | 50 | 50 | 50 |
| | 4,4'-diaminodiphenyl sulfone | 40 | 40 | 40 | 40 | 40 | 40 | 40 | 40 | 40 | 40 | 40 | 40 |
| | PES5003P Thermoplastic resin particle | 10 | 10 | 10 | 10 | 10 | 10 | 10 | 10 | 10 | 10 | 10 | 10 |
| | SP-10 | 0 | 0 | 0 | 0 | 0 | 0 | 0 | 0 | 0 | 0 | 0 | 0 |
| | Epoxy modified nylon particle A Conductive particle | 19.6 | 19.6 | 19.6 | 19.6 | 19.6 | 19.6 | 19.6 | 19.6 | 0 | 0 | 19.6 | 19.6 |
| | "Micropearl" AU215 | 0 | 0 | 0 | 0 | 0 | 0 | 0 | 0 | 0 | 0 | 0 | 0.4 |
| | "Micropearl" AU225 | 0 | 0 | 0 | 0 | 0 | 0 | 0 | 0 | 0 | 0 | 0.4 | 0 |
| | "Bellpearl" C-2000 | 0.4 | 0 | 0 | 0 | 0 | 0 | 0 | 0 | 0 | 0 | 0 | 0 |

TABLE 4-continued

| | | Example | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| | Conductive particle B | 0 | 0.4 | 0 | 0 | 0 | 0 | 0 | 0 | 0 | 0 | 0 | 0 |
| | Conductive particle C | 0 | 0 | 0.4 | 0 | 0 | 0 | 0 | 0 | 0 | 0 | 0 | 0 |
| | Conductive particle D | 0 | 0 | 0 | 0.4 | 0 | 0 | 0 | 0 | 0 | 0 | 0 | 0 |
| | Conductive particle E | 0 | 0 | 0 | 0 | 0.4 | 0 | 0 | 0 | 20 | 0 | 0 | 0 |
| | Conductive particle F | 0 | 0 | 0 | 0 | 0 | 0.4 | 0 | 0 | 0 | 0 | 0 | 0 |
| | Conductive particle G | 0 | 0 | 0 | 0 | 0 | 0 | 0 | 0 | 0 | 20 | 0 | 0 |
| | Surface treated article I of "Micropearl" AU215 | 0 | 0 | 0 | 0 | 0 | 0 | 0.4 | 0 | 0 | 0 | 0 | 0 |
| | Surface treated article J of "Bellpearl" C-2000 | 0 | 0 | 0 | 0 | 0 | 0 | 0 | 0.4 | 0 | 0 | 0 | 0 |
| | Compounding amount of [C] (pts by wt)/ compounding amount of [D] (pts by wt) | 49.0 | 49.0 | 49.0 | 49.0 | 49.0 | 49.0 | 49.0 | 49.0 | — | — | 49.0 | 49.0 |
| Characteristics of prepreg | Containing ratio of particle present in 20% depth range | 96 | 97 | 98 | 97 | 98 | 98 | 97 | 97 | 97 | 97 | 98 | 99 |
| Characteristics of composite material | Compressive strength after impact (MPa) | 285 | 290 | 301 | 297 | 303 | 291 | 299 | 296 | 294 | 267 | 290 | 308 |
| | Volume resistivity ($\Omega$cm) | $2.8 \times 10^3$ | $3.7 \times 10^4$ | $1.1 \times 10^4$ | $3.5 \times 10^4$ | $4.8 \times 10^3$ | $2.2 \times 10^4$ | $5.3 \times 10^3$ | $2.6 \times 10^3$ | $2.7 \times 10^3$ | $3.3 \times 10^3$ | $2.1 \times 10^3$ | $2.0 \times 10^3$ |

TABLE 5

| | | Example | | | | Comparative example | |
|---|---|---|---|---|---|---|---|
| | | 26 | 27 | 29 | 30 | 8 | 9 |
| Thermosetting resin composition | Carbon fiber | T800S | T800S | T800S | T800S | T800S | T800S |
| | Thermosetting resin | | | | | | |
| | Epikote 825 | 50 | 50 | 50 | 50 | 50 | 50 |
| | ELM434 | 50 | 50 | 50 | 50 | 50 | 50 |
| | 4,4'-diaminodiphenyl sulfone | 40 | 40 | 40 | 40 | 40 | 40 |
| | PES5003P | 10 | 10 | 10 | 10 | 10 | 10 |
| | Thermoplastic resin fiber | TR-55 short fiber | TR-55 short fiber | — | TR-55 short fiber | TR-55 short fiber | — |
| | Thermoplastic resin particle | — | — | SP-10 | — | — | — |
| | Conductive fiber | MLD-30 | T008-3 | MLD-30 | — | Conductive fiber A | MLD-30 |
| | Conductive particle | — | — | — | Conductive particle E | — | — |
| | Compounding amount of [C] (pts by wt)/ compounding amount of [D] (pts by wt) | 13.0 | 13.0 | 13.0 | 13.0 | — | — |
| Characteristics of prepreg | Containing ratio of particle present in 20% depth range | 97 | 97 | 98 | 96 | 96 | 98 |
| Characteristics of Composite material | Compressive strength after impact (MPa) | 271 | 269 | 283 | 273 | 268 | 207 |
| | Volume resistivity value ($\Omega$cm) | $4.1 \times 10^4$ | $4.7 \times 10^4$ | $8.3 \times 10^3$ | $3.9 \times 10^3$ | $9.1 \times 10^3$ | $1.8 \times 10^6$ | $5.3 \times 10^3$ |

By comparison between Examples 1 to 6 and Comparative examples 1 to 4, it is found that the carbon fiber reinforced composite material of the present invention peculiarly realizes a high compressive strength after impact and a low volume resistivity, and satisfies a high level impact resistance and conductivity together. And, a relation between these results and the scope of claim of the present invention is summarized in FIG. 2. In FIG. 2, the weight ratio expressed by the [compounding amount of thermoplastic resin particle (parts by weight)]/[compounding amount of conductive particle (parts by weight)] is shown in the horizontal line and, "O" denotes the value of compressive strength after impact shown in the left vertical line and "▲" denotes the volume resistivity shown in the right vertical line. Usually, when the weight ratio expressed by the [compounding amount of thermoplastic resin particle (parts by weight)]/[compounding amount of conductive particle (parts by weight)] is large, an impact resistance is excellent, but a volume resistivity also becomes large, and when the weight ratio expressed by the [compounding amount of thermoplastic resin particle (parts by weight)]/[compounding amount of conductive particle (parts by weight)] is small, a volume resistivity is small, but an impact resistance is poor. It is found that, in the present invention, the scope of claim 1 is a scope where a low volume resistivity and a high compressive strength after impact can be achieved, and it is the range where conductivity and impact resistance can be compatible.

As to these results, the same can be said by comparison between Examples 7 to 30 and Comparative examples 5 to 9. Furthermore, by comparison between Example 3 and Example 7, it is found that Example 3 in which T800S-24K-10E which is a carbon fiber having a tensile modulus of 290 GPa was used is more excellent compared to Example 7 in which T700S-24K-50C which is a carbon fiber having a tensile modulus of 230 GPa was used. And, as shown in Examples 14 to 30, in the present invention, various combination of thermoplastic resin particle or fiber and conductive particle or fiber can be used.

It is found that, compared to Examples 3 and 14, surface treated articles of conductive particle as shown in Examples 20 and 21 can realize a strong adhesion with the thermosetting resin, and has achieved a higher compressive strength after impact.

Furthermore, in Examples 22, 23, without using a thermoplastic resin particle, by using the conductive particle E or G only of which thermoplastic resin nucleus is coated with a conductive substance, or in Example 30, too, without using a thermoplastic resin fiber, by using the conductive fiber A only of which core of thermoplastic resin is coated with the conductive substance, a low volume resistivity and a high compressive strength after impact can be achieved, and it is found that conductivity and impact resistance can be compatible. And, when the conductive particles E and G of Examples 22 and 23 are compared, it is found that the conductive particle E having a higher $G_{1c}$ has achieved a higher compressive strength after impact.

In Example 25 in which the secondary impregnate prepreg was used, the containing ratio of particle present in 20% depth is higher than Example 3, and it is found that a higher conductivity and impact resistance can be obtained.

INDUSTRIAL APPLICABILITY

The prepreg and the carbon fiber reinforced composite material of the present invention has an excellent impact resistance and conductivity together, and can be widely applied to an aircraft structural member, a blade of windmill, an automotive outer panel and computer applications such as an IC tray or a kyotai (housing) of notebook computer, etc., and it is useful.

The invention claimed is:

1. A cured laminate formed by molding and curing two or more prepregs containing a carbon fiber [A], a thermosetting resin [B], thermoplastic resin particles or fibers [C] and conductive particles or fibers [D], wherein a weight ratio expressed by [content of [C] (parts by weight)]/[content of [D] (parts by weight)] is 1 to 1000,
wherein 90 to 100 wt % of each of the thermoplastic resin particles or fibers [C] and the conductive particles or fibers [D] are localized in a 20% depth range from both surfaces of the prepreg in the thickness direction, and wherein the laminate is electrically conductive in a thickness direction.

2. A cured laminate formed by molding and curing two or more prepregs containing a carbon fiber [A], a thermosetting resin [B] and conductive particles or fibers having a thermoplastic resin nucleus or core coated with a conductive substance [E],
wherein 90 to 100 wt % of the conductive particles or fibers [E] are localized in a 20% depth range from both surfaces of the prepreg in the thickness direction, and wherein the laminate is electrically conductive in a thickness direction.

3. A cured laminate according to claim 1, wherein the conductive particles or fibers [D] have an average particle diameter or fiber diameter of equal to or larger than an average particle or fiber diameter of the thermoplastic resin particles or fibers [C] and the average diameter is at most 150 μm.

4. A cured laminate according to claim 1, wherein each of the thermoplastic resin particles or fibers [C] and the conductive particles or fibers [D] have an average diameter of 1 to 150 μm.

5. A cured laminate according to claim 1, wherein 90 to 100 wt % of each of the thermoplastic resin particles or fibers [C] and the conductive particles or fibers [D] are localized in a 20% depth range from one surface of the prepreg in the thickness direction.

6. A cured laminate according to claim 1, wherein 90 to 100 wt % of each of the thermoplastic resin particles or fibers [C] and the conductive particles or fibers [D] are localized in a 20% depth range from an upper surface of the prepreg and localized in a 20% depth range from a lower surface of the prepreg.

7. A cured laminate according to claim 2, wherein the conductive particles or fibers [E] have an average diameter of 1 to 150 μm.

8. A cured laminate according to claim 2, wherein 90 to 100 wt % of the conductive particles or fibers [E] are localized in a 20% depth range from one surface of the prepreg in the thickness direction.

9. A cured laminate according to claim 2, wherein 90 to 100 wt of the conductive particles or fibers [E] are localized in a 20% depth range from an upper surface of the prepreg and localized in a 20% depth range from a lower surface of the prepreg.

10. A carbon fiber reinforced composite material comprising the cured laminate according to any one of claims 1-4 5-7 and 8-9.

11. A prepreg for making a cured laminate being electrically conductive in a thickness direction formed by molding and curing the two or more prepregs, wherein the prepreg contains a carbon fiber [A], a thermosetting resin [B], thermoplastic resin particles or fibers [C] and conductive particles or fibers [D], wherein a weight ratio expressed by [content of [C] (parts by weight)]/[content of [D] (parts by weight)] is 1 to 1000, wherein 90 to 100 wt % of each of the thermoplastic resin particles or fibers [C] and the conductive particles or fibers [D] are localized in a 20% depth range from both surfaces of the prepreg in the thickness direction.

12. A prepreg for making a cured laminate being electrically conductive in a thickness direction formed by molding and curing the two or more prepregs, wherein the prepreg contains a carbon fiber [A], a thermosetting resin [B] and conductive particles or fibers having a thermoplastic resin nucleus or core coated with a conductive substance [E], wherein 90 to 100 wt % of the conductive particles or fibers [E] are localized in a 20% depth range from both surfaces of the prepreg in the thickness direction.

13. A prepreg according to claim 11, wherein the conductive particles or fibers [D] have an average particle diameter or fiber diameter of equal to or larger than an average particle or fiber diameter of the thermoplastic resin particles or fibers [C] and the average diameter is at most 150 μm.

14. A prepreg according to claim 11, wherein each of the thermoplastic resin particles or fibers [C] and the conductive particles or fibers [D] have an average diameter of 1 to 150 μm.

15. A prepreg according to claim 11, wherein 90 to 100 wt % of each of the thermoplastic resin particles or fibers [C] and the conductive particles or fibers [D] are localized in a 20% depth range from one surface of the prepreg in the thickness direction.

16. A prepreg according to claim 11, wherein 90 to 100 wt % of each of the thermoplastic resin particles or fibers [C] and the conductive particles or fibers [D] are localized in a 20% depth range from an upper surface of the prepreg and localized in a 20% depth range from a lower surface of the prepreg.

17. A prepreg according to claim 12, wherein the conductive particles or fibers [E] have an average diameter of 1 to 150 μm.

18. A prepreg according to claim 12, wherein 90 to 100 wt % of the conductive particles or fibers [E] are localized in a 20% depth range from both surfaces of the prepreg in the thickness direction.

19. A prepreg according to claim 12, wherein 90 to 100 wt % of the conductive particles or fibers [E] are localized in a 20% depth range from one surface of the prepreg in the thickness direction.

20. A method of producing a carbon fiber reinforced composite material with conductivity in a thickness direction, the method comprising: disposing prepregs to form an uncured laminate according to any one of claims 11 to 19; and curing the thermosetting resin [B] by pressing and heating the prepregs.

* * * * *